US007339879B2

(12) United States Patent
Ando et al.

(10) Patent No.: US 7,339,879 B2
(45) Date of Patent: Mar. 4, 2008

(54) INFORMATION STORAGE MEDIUM, INFORMATION RECORDING METHOD, AND INFORMATION RECORDING/REPRODUCTION APPARATUS

(75) Inventors: Hideo Ando, Hino (JP); Kazuo Watabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/562,159

(22) Filed: Nov. 21, 2006

(65) Prior Publication Data

US 2007/0091778 A1 Apr. 26, 2007

Related U.S. Application Data

(60) Continuation of application No. 10/962,497, filed on Oct. 13, 2004, which is a division of application No. 10/058,084, filed on Jan. 29, 2002, now Pat. No. 7,075,877.

(30) Foreign Application Priority Data

May 14, 2001 (JP) ............................ 2001-143530

(51) Int. Cl.
*G11B 7/24* (2006.01)

(52) U.S. Cl. ................................ 369/275.3; 369/59.25

(58) Field of Classification Search ..................... None
See application file for complete search history.

(56) References Cited

U.S. PATENT DOCUMENTS 5,771,248 A * 6/1998 Katayama et al. .......... 714/763
6,031,814 A 2/2000 Nagata et al.
6,252,845 B1 * 6/2001 Hino et al. .............. 369/275.3
6,266,318 B1 * 7/2001 Honda et al. ............ 369/275.3
6,301,208 B1 * 10/2001 Sugaya et al. ............. 369/47.1
6,401,169 B1 6/2002 McMurdie et al.
6,405,283 B1 6/2002 James
6,546,475 B1 * 4/2003 Haseno ....................... 711/167
6,577,462 B1 6/2003 Hamada et al.
6,721,251 B2 * 4/2004 Kojima et al. ........... 369/47.54
7,075,877 B2 * 7/2006 Ando et al. .............. 369/59.25

FOREIGN PATENT DOCUMENTS

| | | |
|---|---|---|
| EP | 0 825 591 | 2/1998 |
| EP | 0 843 305 | 5/1998 |
| JP | 7-211002 | 8/1995 |
| JP | 9-161402 | 6/1997 |
| JP | 9-219024 | 8/1997 |
| JP | 11-7631 | 1/1999 |
| JP | 11-25459 | 1/1999 |
| JP | 2000-298842 | 10/2000 |
| JP | 2001-84598 | 3/2001 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

This invention achieves high-density recording while preventing recording units from overlapping. Recording is done to form a gap between predetermined recording units. Since this gap is formed, even when a rotation driving mechanism of a medium suffers rotation nonuniformity, two neighboring recording units never overlap each other, and destruction of recording data can be prevented.

1 Claim, 14 Drawing Sheets

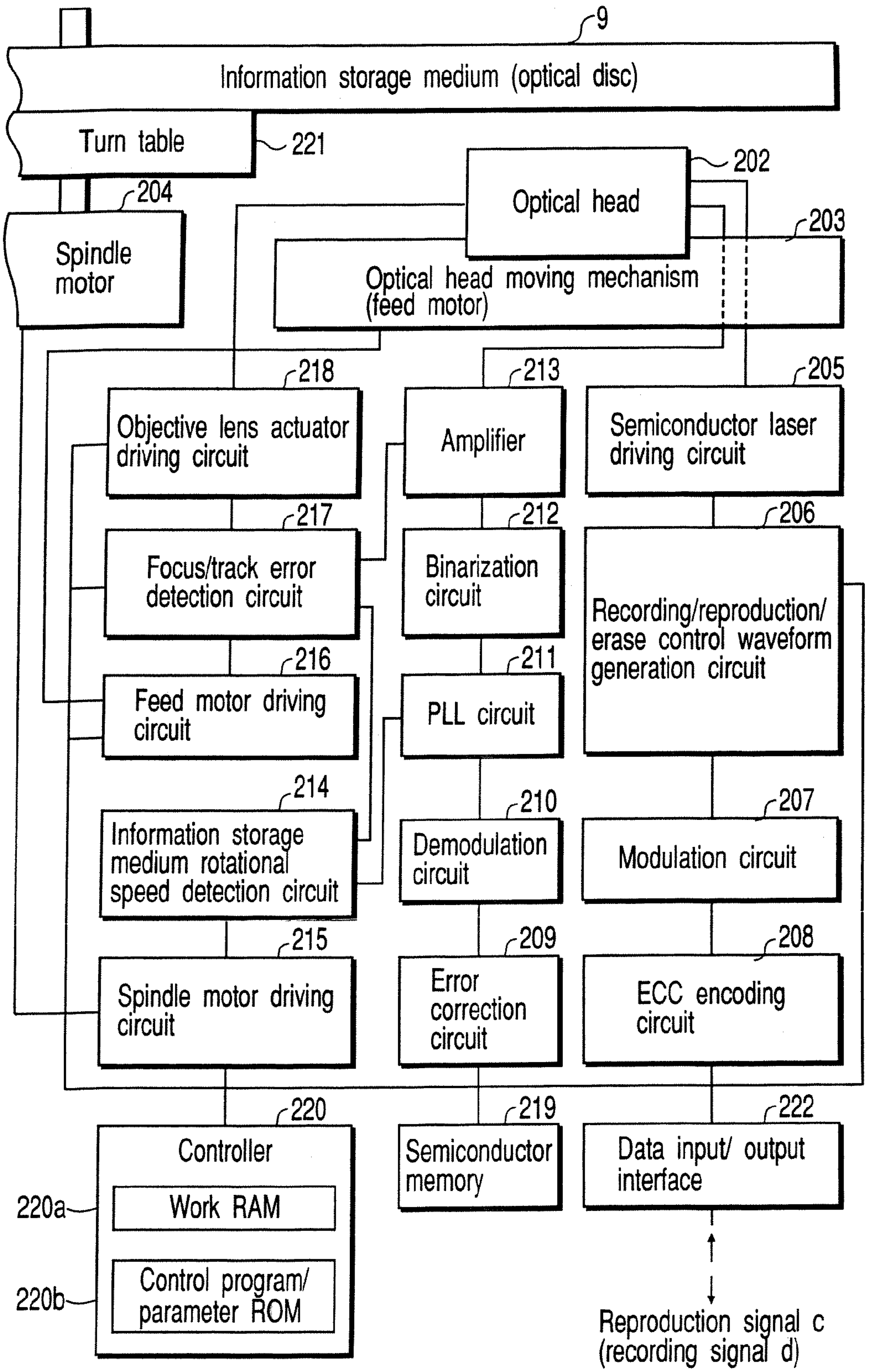
F I G. 6

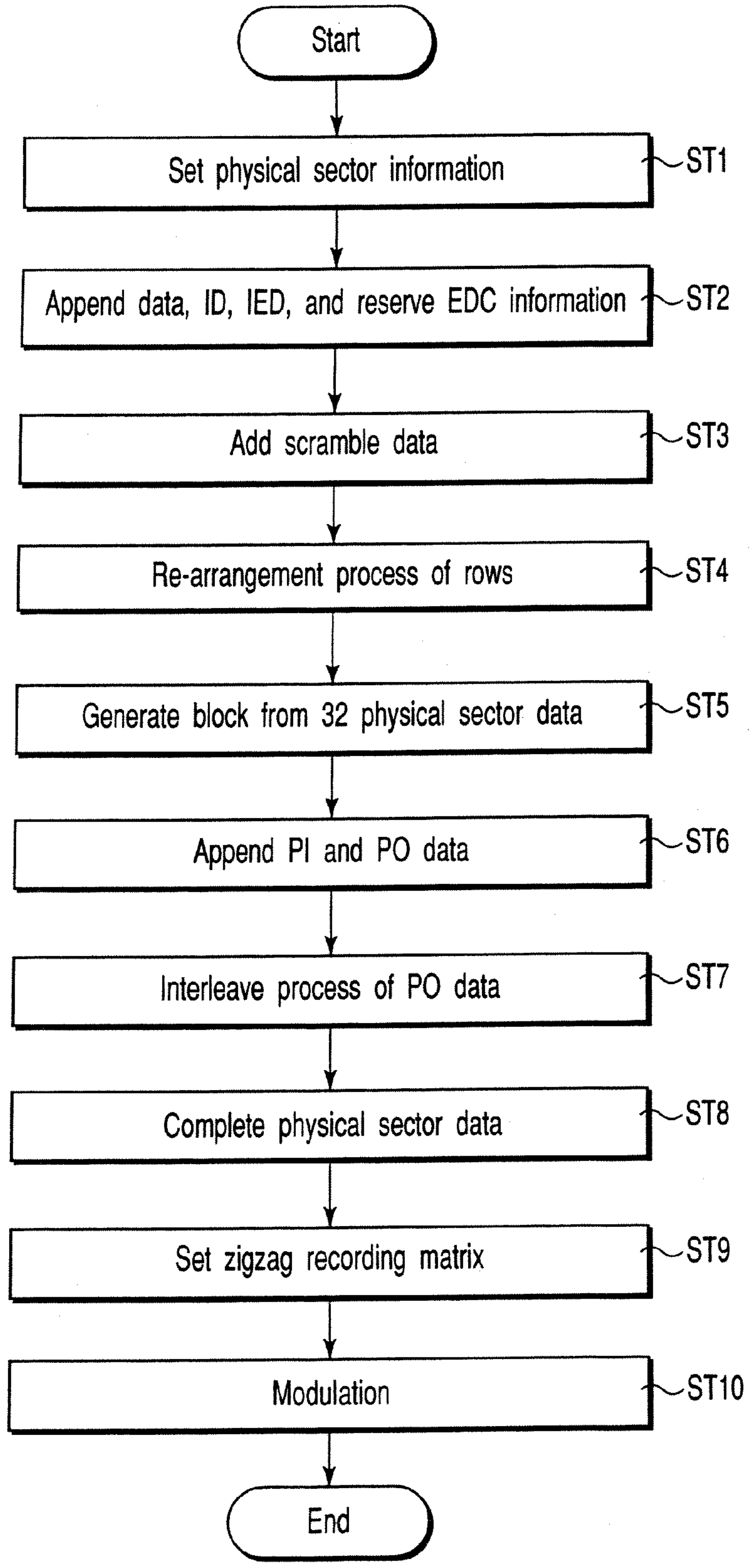
F I G. 7

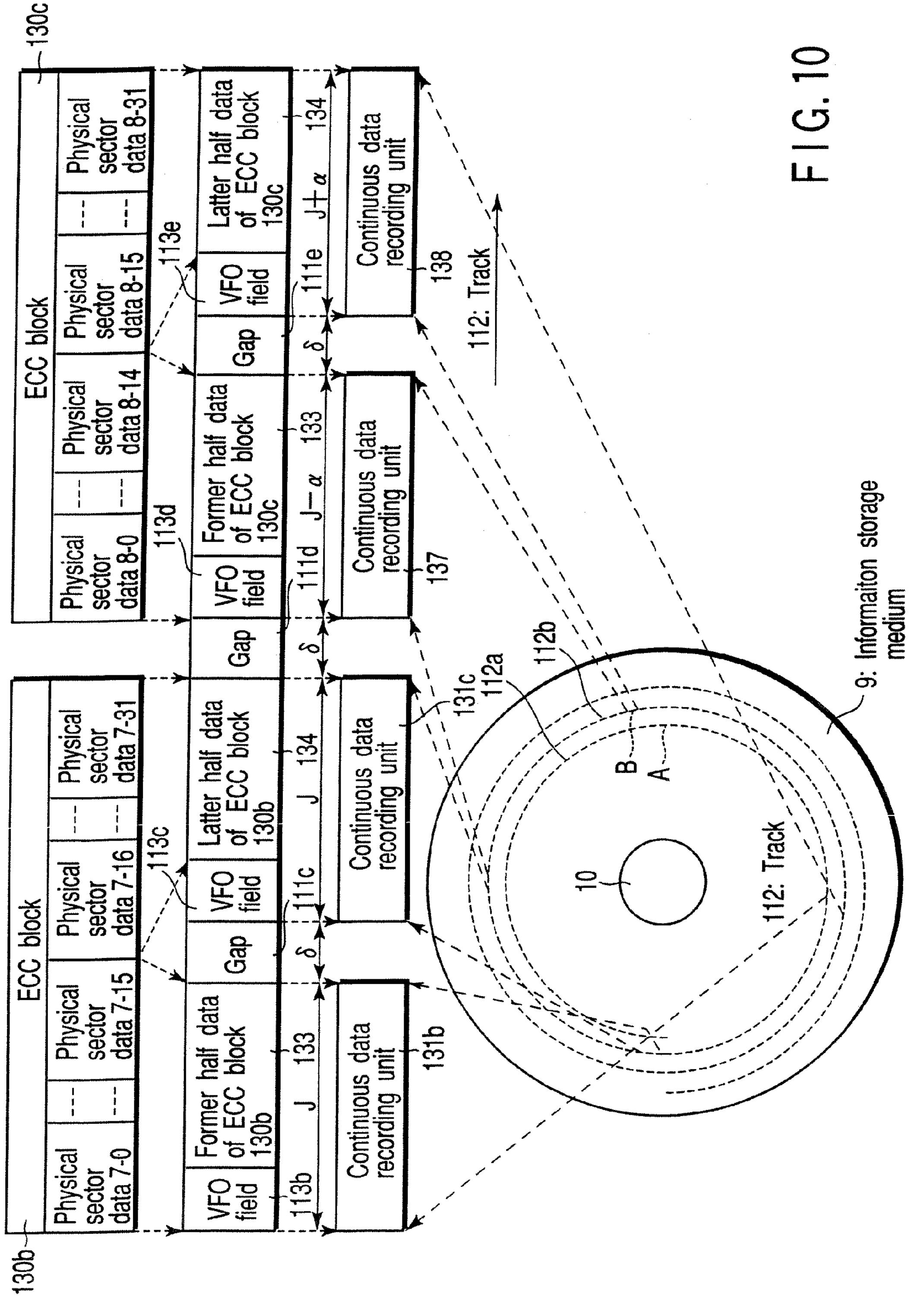
F I G. 10

INFORMATION STORAGE MEDIUM, INFORMATION RECORDING METHOD, AND INFORMATION RECORDING/REPRODUCTION APPARATUS

CROSS-REFERENCE TO RELATED APPLICATIONS

This application is a continuation application of U.S. patent application Ser. No. 10/962,497, filed Oct. 13, 2004, which is a divisional application of U.S. patent application Ser. No. 10/058,084, filed Jan. 29, 2002 and now issued as U.S. Pat. No. 7,075,877. This application is also based upon and claims the benefit of priority from the prior Japanese Patent Application No. 2001-143530, filed May 14, 2001, the entire contents of which are incorporated herein by reference.

BACKGROUND OF THE INVENTION

1. Field of the Invention

The present invention relates to a high-density information recording technique using a focused beam (blue laser or the like). More particularly, the present invention relates to an improvement in an information recording method for a high-density optical disc on/from which digital information is recorded/reproduced at constant linear velocity (CLV). Also, the present invention relates to an inter-layer crosstalk reduction technique in a recordable optical disc having a recording multilayer including two or more layers per side.

2. Description of the Related Art

As a high-density information storage capable of repeated recording (repeated rewrite) using a focused beam, optical discs such as a DVD-RAM, DVD-RW, and the like is known.

<<Problem 1>>

In a DVD-RW (rewritable medium), new data is recorded by partially overwriting an already data recorded portion (Restricted Overwrite). In this case, since already recorded data is partially destroyed to record the next data, the reliability of information recorded on an information storage medium suffers considerably.

<<Problem 2>>

On the other hand, a DVD-RAM (repeated recordable medium) suffers the following problems:

a) Since data are recorded between neighboring ones of a large number of prepit headers present on an information storage medium, the information recording efficiency (recording density) lowers, thus disturbing large capacity.

b) When a two-recording layer structure per side is adopted for large capacity, inter-layer crosstalk is generated due to prepit headers, thus deteriorating reproduction signal characteristics. That is, in a recording layer, since recorded and unrecorded portions have a light reflectance difference, inter-layer crosstalk in which the presence/absence of recording marks on the other recording layer influences a reproduction signal is generated, thus deteriorating reproduction signal characteristics.

BRIEF SUMMARY OF THE INVENTION

According to an aspect of the present invention, predetermined recording units (e.g., 16 to 32 sectors/ECC blocks of 32 to 64 kbytes) are recorded to have a gap (δ) therebetween. Since the gap (δ) is formed, even when a rotation driving mechanism (spindle motor) of a medium suffers rotation nonuniformity, neighboring recording units can be prevented from overlapping each other, thus preventing recorded data from being destroyed (due to some recording marks destroyed when the neighboring recording units overlap each other), and maintaining high reliability of recorded data.

According to another aspect of the present invention, in this invention using a one-sided, recording multilayer type disc-shaped medium (e.g., one-sided, two-layered optical disc 9) which has spiral tracks with track pitch Pt, data recording is done via an objective lens having numerical aperture NA and an intermediate layer which has refractive index n and thickness t. This data recording is made to form a gap (δ) between predetermined recording units (ECC blocks). If $D=2t \tan\{\sin^{-1}(NA/n)\}$, length δ of the gap is given by "$\delta \leqq \pi(D+Pt)D/Pt$".

According to still another aspect of the present invention, upon successively recording data for respective predetermined recording units (ECC blocks) along spiral tracks on a disc-shaped information storage medium having a rotation center, a gap (δ) is formed between the predetermined recording units (ECC blocks) along the tracks. In at least one pair of neighboring tracks of the tracks, the angular position of the gap (δ) formed on one of the neighboring tracks with respect to the rotation center is different from the angular position of the gap (δ) formed on the other one of the neighboring tracks with respect to the rotation center.

BRIEF DESCRIPTION OF THE SEVERAL VIEWS OF THE DRAWING

FIG. 6 is a block diagram for explaining the arrangement of an information recording/reproduction apparatus according to the embodiment of the present invention;

FIG. 7 is a flow chart for explaining the format sequence in the ECC block structure in FIG. 4;

FIG. 10 is a view for explaining a data recording method on an information storage medium (recordable optical disc using a blue laser) according to still another embodiment of the present invention;

DETAILED DESCRIPTION OF THE INVENTION

An information storage medium, information recording method, and information recording/reproduction apparatus according to various embodiments of the present invention will be described hereinafter with reference to the accompanying drawings.

Figure 1:
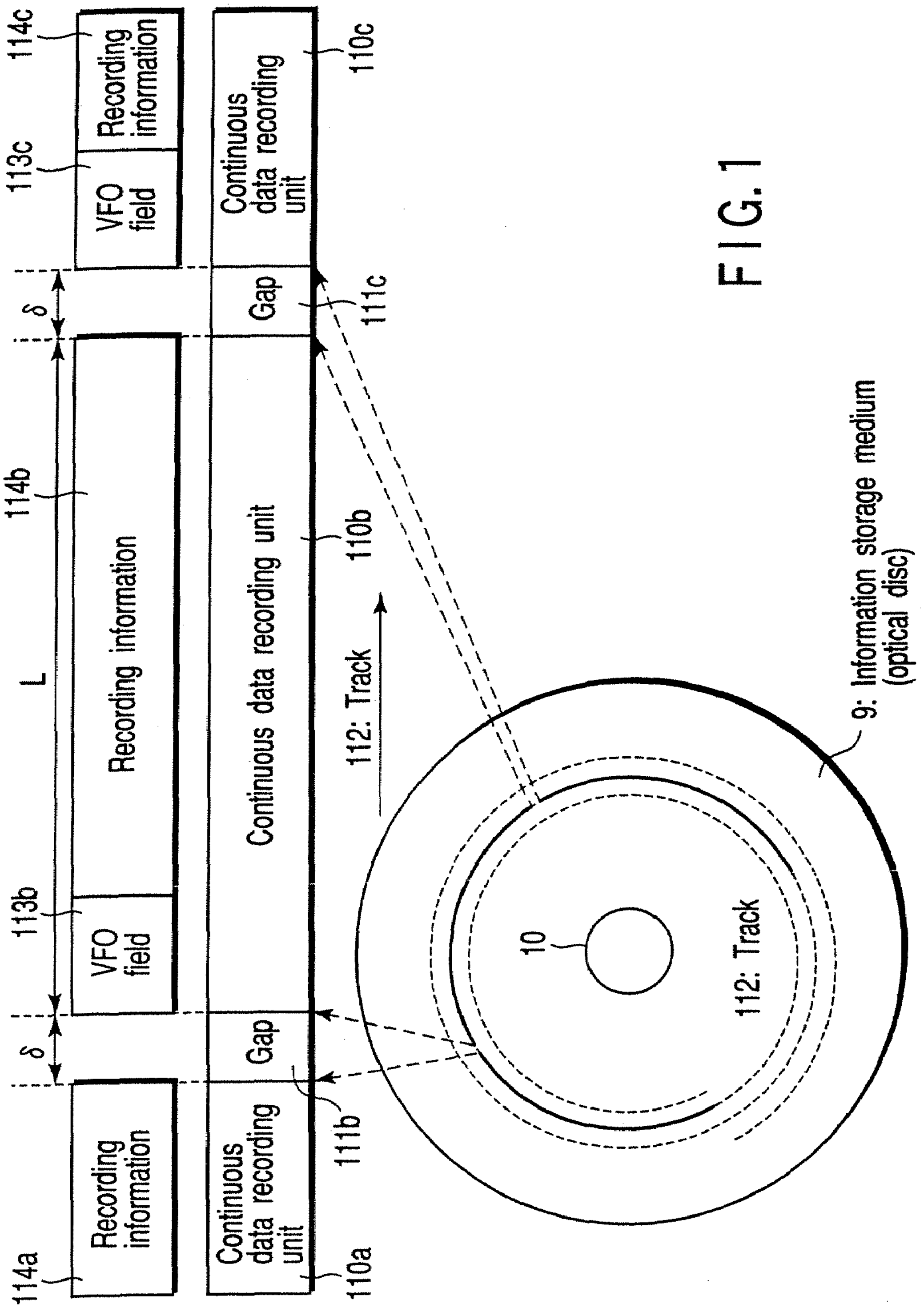
FIG. 1 is a view for explaining a data recording method on an information storage medium (recordable optical disc using a blue laser) according to an embodiment of the present invention.
Figure 2:
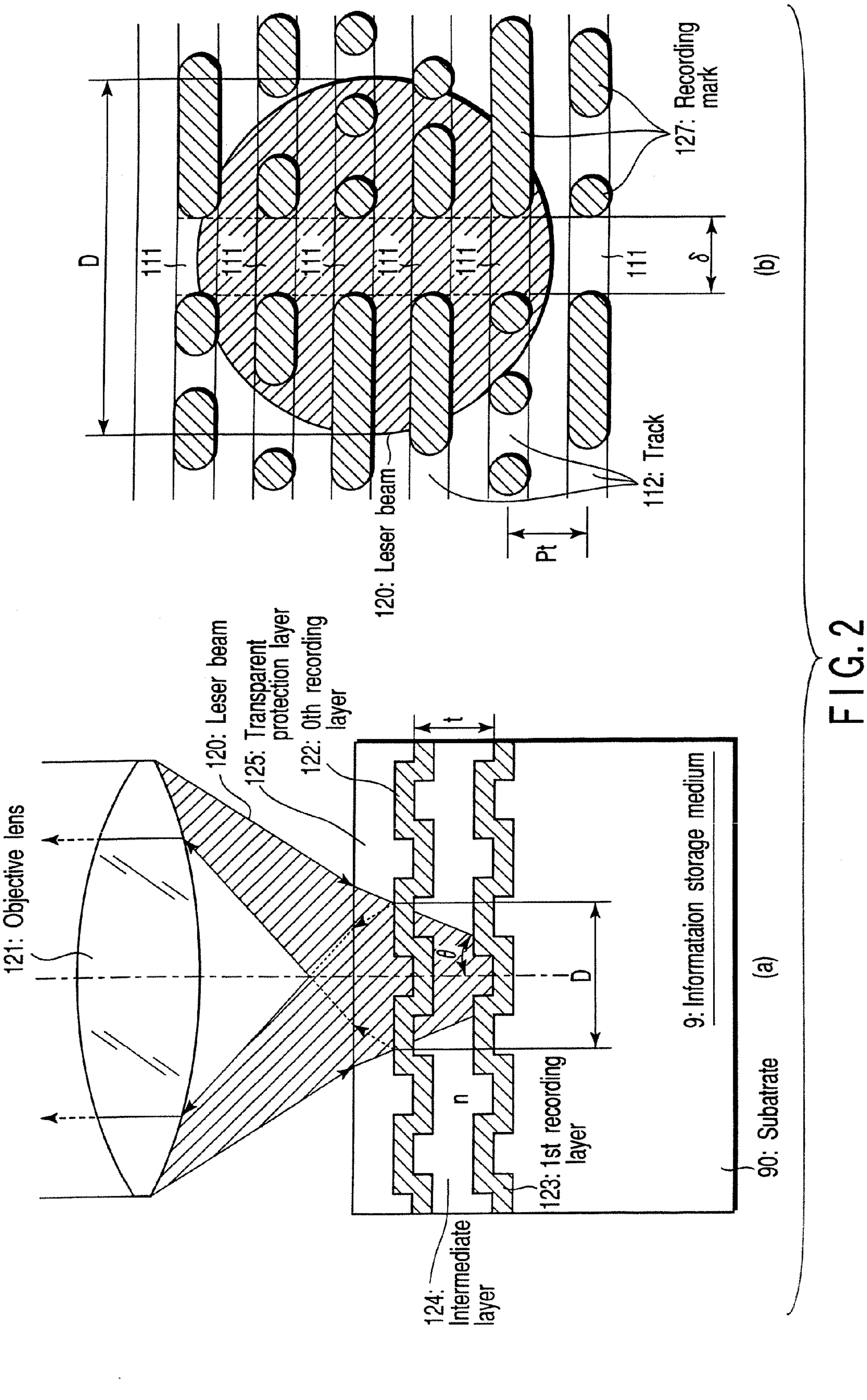
FIG. 2 is a view for explaining inter-layer crosstalk in the information storage medium (one-sided, two-layered type) according to the embodiment of the present invention.

FIG. 1 is a view for explaining the basic concept of a data recording method on information storage medium (recordable optical disc using a blue laser) 9 according to an embodiment of the present invention. FIG. 2 schematically shows the structure of this information storage medium (one-sided, two-layered type) 9.

When information storage medium 9 in FIG. 1 is of one-sided, two-layered type shown in (a) of FIG. 2, for example, phase change type first recording layer 123 is formed on substrate 90 of medium 9, intermediate layer 124 which has thickness t and refractive index n is formed thereon, phase change type 0th recording layer 122 is formed thereon, and transparent protection layer 125 (having a thickness of about 100 μm) is formed thereon.

On information storage medium 9 shown in FIGS. 1 and 2, fine pre-grooves are spirally or concentrically formed as embossed patterns, and form tracks 112. By forming recording marks 127 (in (b) of FIG. 2) on the recording layer (122 or 123 in (a) of FIG. 2) along tracks 112, information is recorded.

In this embodiment, information is recorded or rewritten for respective continuous data recording units (110*a*, 110*b*, and 110*c* in FIG. 1) where recording marks 127 are continuously formed, thus forming recording marks 127. In this case, gaps 111*b* and 111*c* with length δ are formed between neighboring continuous data recording units 110*a*, 110*b*, and 110*c*. In this way, the gist of the data recording method according to this embodiment resides in formation of predetermined gap δ between neighboring data recording units.

When gaps 111*b* and 111*c* are formed between neighboring continuous data recording units 110*a*, 110*b*, and 110*c*, as shown in FIG. 1, these gaps (δ) absorb the influence (jitter) of rotation nonuniformity of a spindle motor (204 in FIG. 6 to be described later) that rotates disc-shaped medium 9. That is, since this gap (e.g., 111*b*) is formed, even when large jitter is produced due to rotation nonuniformity of a rotation driving system upon information recording, an overlapping portion can be prevented from being formed between neighboring continuous data recording units (e.g., 110*a* and 110*b*), and data in each continuous data recording unit 110 can be stably and easily rewritten. This is a large feature obtained by the data recording method that forms gap δ between neighboring data recording units.

This embodiment adopts CLV (Constant Linear Velocity) recording in which length δ of each gap 111 and length L of each continuous data recording unit 110 always become constant independently of the radial position in information storage medium 9. A data structure in continuous data recording unit 110 is formed by recording synchronization VFO (Variable Frequency Oscillator) area 113 formed at the beginning of continuous data recording unit 110, and recording area 114 which follows area 113.

Note that the contents of recorded information 114 in FIG. 1 are obtained by modulating and recording data of one whole ECC block (e.g., data as a combination of small ECC block 8-0 in (f) of FIG. 4 to be described later and small ECC block 8-1 in (g) of FIG. 4). However, the contents upon practicing the present invention are not limited to these contents. For example, the practice contents of the present invention include a case wherein recorded information 114 is made up of a plurality of ECC blocks or of a fraction of an integer of data in one ECC block. Alternatively, one recorded information 114 may be formed of one or a plurality of pieces of physical sector information 4 shown in FIG. 3 (to be described later).

A great reduction effect of inter-layer crosstalk on one-sided, two-recording layer type information storage medium 9 by the recording method in FIG. 1 will be explained below using FIG. 2.

For example, a case will be examined below wherein laser beam (its wavelength λ is around 405 nm) 120 is focused on first recording layer 123 via objective lens 121 (its numerical aperture NA is, for example, around 0.85), and information recorded on first recording layer 123 is reproduced by detecting a change in amount of light reflected by first recording layer 123, as shown in (a) of FIG. 2. At this time, some light components of laser beam 120 are reflected by 0th recording layer 122, pass through objective lens 121 again, and leak into detection light.

As described above in <<Problem 2>> of the prior art, already recorded and unrecorded portions (inside and outside recording marks 127) in recording layers 122 and 123 have a light reflectance difference. Therefore, the amount of light which is reflected by 0th recording layer 122 and leaks into detection light changes considerably between a case wherein 0th recording layer 122 is completely unrecorded and has no recording marks 127, and a case wherein data have already been recorded on the entire surface of 0th recording layer 122 and recording marks 127 are distributed everywhere. The change in amount of light which is reflected by 0th recording layer 122 and leaks into detection light is reflected by first recording layer 123 and leaks into a reproduction signal used to reproduce information (inter-layer crosstalk), thus deteriorating reproduction signal characteristics.

Let D be the diameter of laser beam 120 that strikes 0th recording layer 122, NA be the numerical aperture of objective lens 121, n be the refractive index of intermediate layer 124, and t be the thickness of intermediate layer 124 under the condition that the laser beam is focused on first recording layer 123 shown in (a) of FIG. 2. Then, since:

$$NA=n\sin\theta \quad (1)$$

$$D=2t\tan\theta \quad (2)$$

we have $$D=2t\tan\{\sin^{-1}(NA/n)\} \quad (3)$$

A case will be examined below wherein a plurality of neighboring gaps 111 align in the radial direction (perpendicular to tracks 112) of optical disc 9, as shown in (b) of FIG. 2.

If δ>D, laser beam 120 may completely fall within the region where the plurality of neighboring gaps 111 align (not shown). At this time, the region of laser beam 120 with diameter D contains no recording marks 127 at all, i.e., corresponds to an unrecorded state (which will be referred to as state α hereinafter for the sake of simplicity).

If laser beam 120 with diameter D has moved to a position largely separated from the region where gaps 111 align, the entire surface within the region of laser beam 120 with diameter D is filled with recording marks 127 (this state will be referred to as state β hereinafter).

As described above, since regions inside and outside each recording mark 127 have a light reflectance difference, the amounts of laser beam 120 reflected by 0th recording layer 122 in states α and β have a large difference, and very large inter-layer crosstalk occurs consequently.

By contrast, if δ≦D, i.e., a state that satisfies:

$$\delta \leqq 2t \tan\{\sin^{-1}(NA/n)\} \quad (4)$$

is set, since the region where gaps 111 align is present only on a portion within the region of laser beam 120 with diameter D, a change in amount of laser beam 120 reflected by 0th recording layer 122 (i.e., inter-layer crosstalk) when laser beam 120 passes by the region where gaps 111 align becomes smaller than the difference between states α and β described above.

In this manner, since gaps 111*b* and 111*c* are laid out between neighboring continuous recording units 110*a*, 110*b*, and 110*c*, and gaps 111*b* and 111*c* are set to have small length δ, an inter-layer crosstalk amount upon reproduction of one-sided, multi-layered disc can be reduced. A large characteristic feature of this embodiment lies in this point.

Note that the inter-layer crosstalk reduction effect appears remarkably when:

$$\delta \leqq D/2 \text{ (i.e., } \delta \leqq t \tan\{\sin^{-1}(NA/n)\}) \quad (5)$$

As a result of further tests and evaluations, when δ is limited to fall within the range:

$$\delta \leqq D/4 \text{ (i.e., } \delta \leqq t \tan\{\sin^{-1}(NA/n)\}/2) \quad (6)$$

a condition that suffers less characteristic deterioration of a reproduction signal (suffers less influence of inter-layer crosstalk) can be obtained.

For example, when NA=0.85, n=1.57, and t=50 μm, gap δ is δ≦64 μm from inequality (4). On the other hand, δ≦32 μm from inequality (5), and δ≦16 μm from inequality (6).

As described above, in the embodiment of the present invention, data are recorded along tracks by CLV. Hence, at a radial position where the length per round of information storage medium 9 deviates from an integer multiple of length L+δ(i.e., the physical periodic length of gaps 111 which align at intervals in the direction along tracks 112), the positions of gaps 111 are different from each other between neighboring tracks.

By contrast, at a radial position where the length per round of information storage medium 9 matches an integer multiple of length L+δ (physical periodic length of gaps 111), gaps 111 are arranged at neighboring positions between neighboring tracks, and gap regions 111 align in the radial direction of information storage medium 9, as shown in (b) of FIG. 2. At such radial position, the physical periodic length of gaps 111 is changed in the direction along tracks 112 to lay out gaps 111 at non-neighboring positions between neighboring tracks. A characteristic feature of the present invention also lies in this point.

Figure 3:
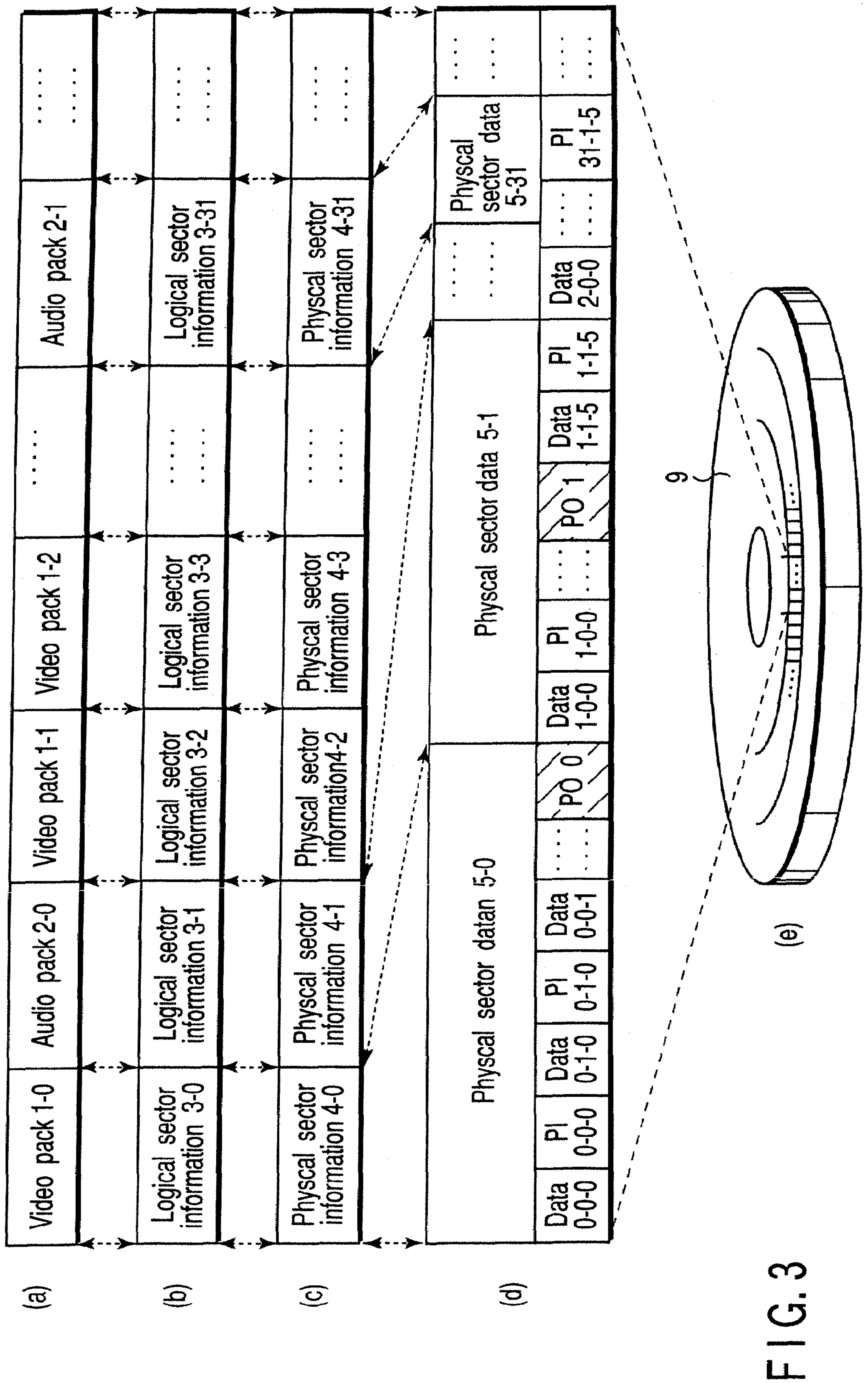
FIG. 3 is a view for explaining the configuration of physical sector data recorded on the information storage medium according to the embodiment of the present invention.

FIG. 3 is a view for explaining the configuration of physical sector data recorded on the information storage medium according to the embodiment of the present invention. FIG. 4 is a view for explaining a method of forming an ECC block with respect to physical sector data shown in FIG. 3. The concept associated with the structure in an ECC block in the embodiment of the present invention will be explained below with reference to FIGS. 3 and 4.

AV information and stream information, which are transferred continuously, are broken up into small pieces, which are converted into pack structures appended with pack headers, and these packs are recorded on information storage medium (optical disc) 9. That is, as shown in (a) of FIG. 3, video information and audio information are transferred while being arranged along the time axis in the form of video packs 1-0, 1-1, 1-2, . . . , and audio packs 2-0, 2-1, 2-2, . . . Each of video packs 1-0, . . . and audio packs 2-0, . . . has a data size of 2048 bytes, which match the logical sector information size. Video packs 1-0, . . . and audio packs 2-0, . . . are abstractly handled as a plurality of pieces of logical sector information 3-1 to 3-31 in the logical layer, as shown in (b) of FIG. 3. (That is, examples of practical contents of the plurality of pieces of logical sector information 3-1 to 3-31 correspond to video packs 1-0, . . . and audio packs 2-0, . . . )

Figure 4:
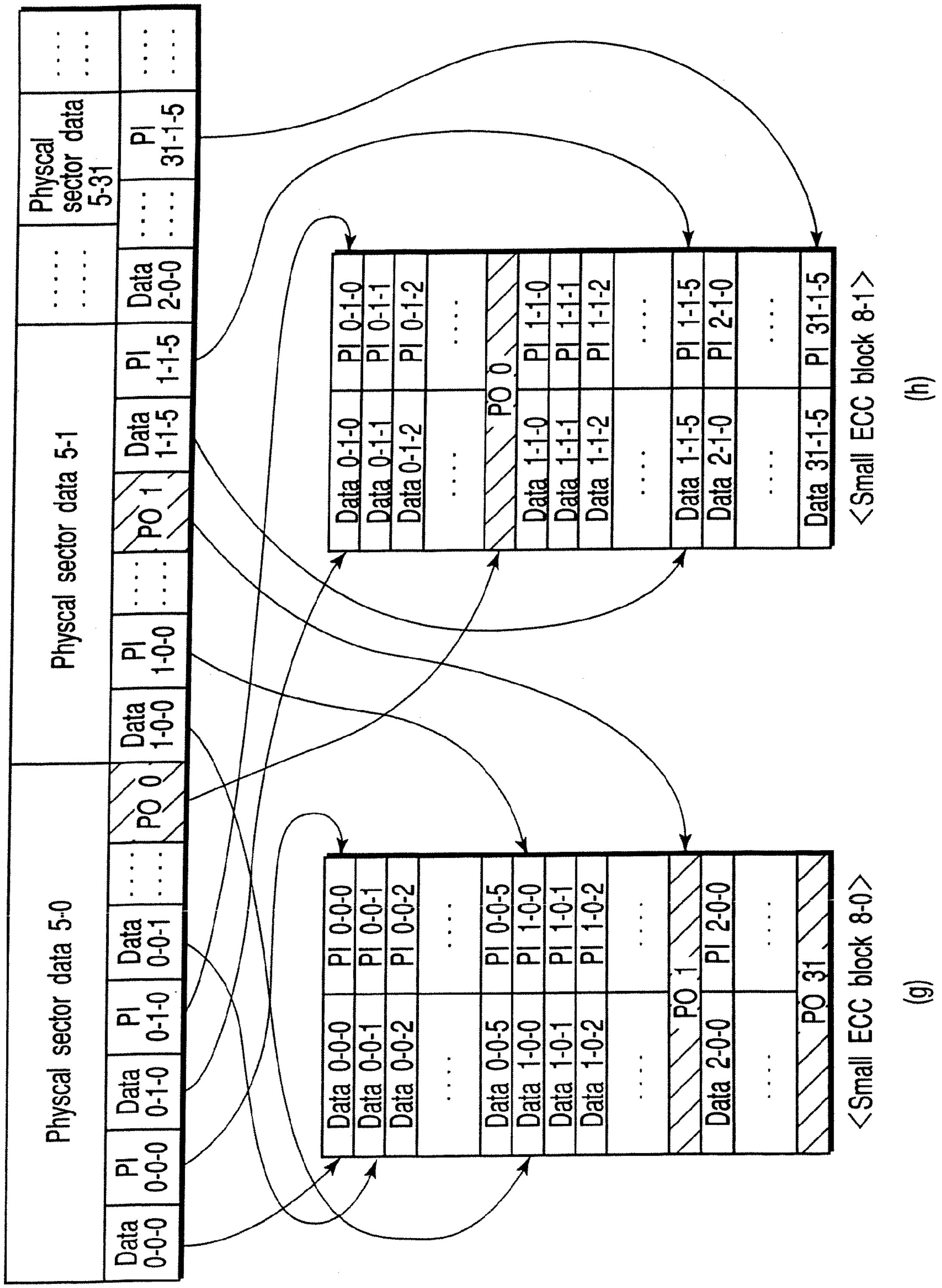
FIG. 4 is a view for explaining a method of forming an ECC block with respect to physical sector data shown in FIG. 3.

In the embodiment shown in FIGS. 3 and 4, since physical sector information and logical sector information match, these pieces of information are handled as a plurality of pieces of physical sector information 4-0 to 4-31, as shown in (c) of FIG. 3.

As will be described in detail later, each physical sector information (4-0 to 4-31) has the following configuration. That is, 4-byte PID information, 2-byte IED information, and a 10-byte reserve field (the size in an existing DVD is 6 bytes) are arranged at the head of each information, and 4-byte EDC is arranged at the end of information (data 0-0-0 to data 0-0-5). After that, that sequence is broken up into 188-byte data (each of data 0-0-0 to data 0-0-5), error correction PI (inner-code parity) data (PI0-0-0 to PI0-0-5) are appended to every 188-byte data, and these data are arranged in turn, as shown in (d) of FIG. 3 or (d) of FIG. 4. In odd-numbered physical sector data (first physical sector data 5-0), PO (outer-code parity) data (PO0) is arranged at the end of data to complete physical sector data 5-0.

The embodiment of the present invention is characterized in that even-numbered physical sector data (second physical sector data 5-1) has a structure in which PO data (PO1) is arranged in the second column from the end of data, and data 1-1-5 and PI data (PI1-1-5) are arranged at the end of the even-numbered physical sector data. Physical sector data 5-0 to 5-31, which are completed in this manner, are recorded on an optical disc (information storage medium 9) in accordance with the order they are arranged, as shown in (e) of FIG. 3.

As shown in (d), (f), and (g) of FIG. 4, one physical sector data 5-0 is formed as a combination of data in two different small ECC blocks 8-0 and 8-1. (In this embodiment, ECC blocks 8-0 and 8-1 (small units) shown in (f) and (g) of FIG. 4 are called small ECC blocks, and a combination of two small ECC blocks 8-0 and 8-1 as a whole is called a general ECC block.)

More specifically, data in physical sector data 5-0 is finely broken up into 200-byte data, and 188-byte data 0-0-0 and PI data 0-0-0 are arranged in the first row in ECC block 8-0. Next 188-byte data 0-1-0 and PI 0-1-0 in physical sector data 5-0 are arranged in the first row in small ECC block 8-1. Furthermore, next 188-byte data 0-0-1 and PI data 0-0-1 are arranged on the second row in ECC block 8-0. Of PO data in small ECC block 8-1, first 200 bytes are inserted in the sixth row in small ECC block 8-1 as PO0. As a result, data from data 0-0-0 to PO0 form physical sector data 5-0.

First data 1-0-0 and PI 1-0-0 that follows the first data in next physical sector data 5-1 are arranged in the seventh row in ECC block 8-0, as shown in (f) of FIG. 4. Of PO data in ECC block 8-0, first 200-byte data is arranged as PO1 in the 12th row in ECC block 8-0.

In this way, PO data (PO0, PO1) for respective rows (200 bytes) are arranged at equal intervals for respective physical sector data 5-0 to 5-31, and their arrangement positions have a difference for one physical sector data between a pair of small ECC blocks 8-0 and 8-1.

Figure 5:
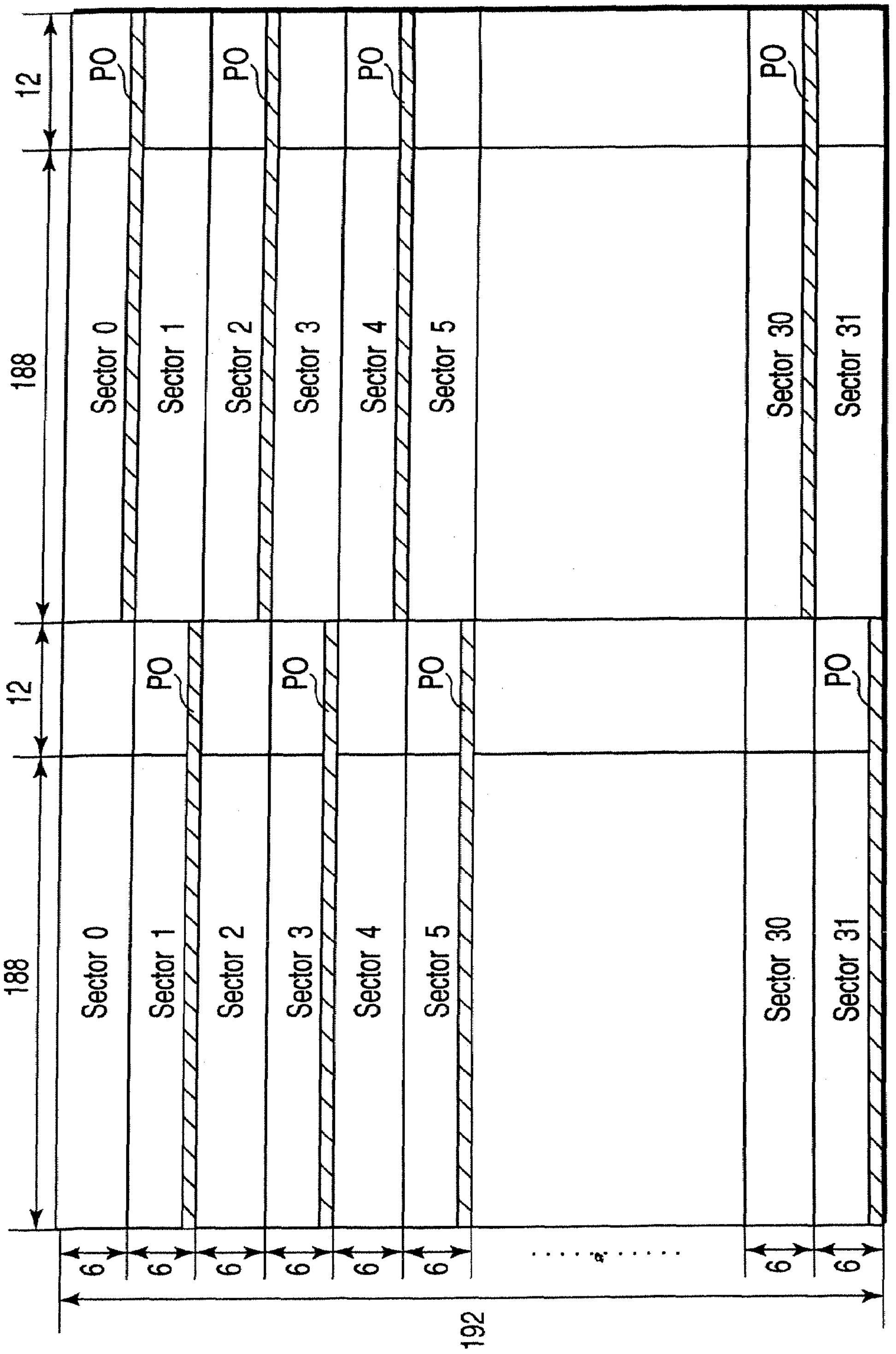
FIG. 5 is a view for explaining the internal structure of an ECC block recorded on the information storage medium according to the embodiment of the present invention.

FIG. 5 is a view for explaining the internal structure of an ECC block recorded on the information storage medium according to the embodiment of the present invention. FIG. 5 exemplifies the detailed structure in small ECC block 8-0 or 8-1 shown in (f) or (g) of FIG. 4. Note that the numerals assigned to "sectors" in FIG. 5 indicate row numbers of data sectors.

The right side of FIG. 5 shows a combined state of two, right and left (for each 200-byte column) small ECC blocks. Each small ECC block has a structure in which 12-byte PI data is appended every 188 bytes, and PO data for 16 rows is appended. The PO data for 16 rows is decomposed into row data, each of which is interleaved and inserted at every 12-row positions. A hatched portion of 200-byte columns per row in FIG. 5 means interleaved and inserted PO data.

The user information size assigned per sector is 2048 bytes as in an existing DVD, and information having the same contents as those of logical sector information recognized in the application layer is set as each physical sector information (main data). Four-byte data ID information, 2-byte IED information, and 10-byte reserve field (the size in an existing DVD is 6 bytes) are arranged at the head of 2048 bytes of the main data (physical sector information), and 4-byte EDC data is arranged at the end of the main data, thus forming all data of a physical sector.

Since one physical sector data is interleaved across two small ECC blocks (i.e., within a general ECC block), an error-correctable burst error length can be improved to nearly twice that of the prior art. That is, one physical sector data is broken up into 188-byte data, each of which forms one row data by appending 12-byte PI data (since the existing PI size is 10 bytes, and is increased to 12 bytes, error correction performance per row can be improved), and these row data are alternately and sequentially arranged in right and left different ECC blocks. This is also one of the characteristic features of this embodiment.

Data (data sector) in one physical sector has an odd number of rows, i.e., 11 rows. This is also a characteristic feature of this embodiment. Since the data sector is made up of an odd number of rows, the total number of rows can be even upon inserting one PO row in each physical sector, and the PO row can be properly inserted in two small ECC blocks (i.e., one general ECC block) without forming any odd row.

PID information is always arranged at the head position (upper left corner position in FIG. 5) of each physical sector, and the PO insert positions are devised to allow efficient interleave insertion of PO data in the embodiment shown in FIG. 5. That is, PO data is arranged at the last row position of an even sector, and PO data is arranged at the second row position from the end of the sector in an odd sector. As a result, PO data are arranged in a single ECC block, and all physical sectors can have the same data size. This is also a characteristic feature of this embodiment.

The arrangement of an information recording/reproduction apparatus according to the embodiment of the present invention will be described below with reference to FIG. 6.

1. Function of Information Recording/Reproduction Unit 1-1. Basic Function of Information Recording/Reproduction Unit An information recording/reproduction unit executes the following processes are done. That is, the unit records new information or rewrites (or erase) information at a predetermined position on information storage medium (optical disc) 9 using a focused beam spot; and the unit reproduces already recorded information from a predetermined position on information storage medium (optical disc) 9 using a focused beam spot.

1-1-1. Basic Function Achieving Means of Information Recording/Reproduction Unit As means for achieving the above basic functions, the information recording/reproduction unit executes the following processes. That is, the unit traces a focused beam spot along tracks 112 on information storage medium 9;

the unit switches recording/reproduction/erase of information by changing the amount of light of a focused beam spot with which information storage medium 9 is irradiated; and the unit converts externally input recording signal d into an optimal signal to record it at high density and with a low error rate.

2. Structure of Mechanism Portion and Operation of Detection Portion 2-1. Basic Structure of Optical Head 202 and Signal Detection Circuit 2-1-1. Signal Detection by Optical Head 202

Optical head 202 basically comprises a semiconductor laser element (not shown) as a light source, a photodetector, and an objective lens. A laser beam emitted by the semiconductor laser element is focused on information storage medium (optical disc) 9 via the objective lens (121 in FIG. 2). The laser beam reflected by a light reflection film or light reflective recording film (122 or 123 in FIG. 2) of information storage medium (optical disc) 9 is photoelectrically converted by the photodetector. A detection current obtained by the photodetector undergoes current-voltage conversion by amplifier 213 to obtain a detection signal. This detection signal is processed by focus/track error detection circuit 217 or binarization circuit 212.

In general, the photodetector is divided into a plurality of photodetection regions, which individually detect changes in amount of light with which the respective photodetection regions are irradiated. Respective detection signals undergo sum/difference calculations by the focus/track error detection circuit 217, thus detecting focus and track errors. In this way, a change in amount of light reflected by the light reflection film or light reflective recording film of information storage medium (optical disc) 9 is detected, thereby reproducing signal c on information storage medium 9.

2-1-2. Objective Lens Actuator Structure

The objective lens (121 in FIG. 2) that focuses a laser beam emitted by the semiconductor laser element on information storage medium 9 is movable in two axis directions in accordance with an output current from objective lens actuator driving circuit 218.

The objective lens moves:

in a direction perpendicular to information storage medium 9 to correct focus errors; and in the radial direction of information storage medium 9 to correct track errors.

Such objective lens moving mechanism is called an objective lens actuator.

2-2A. Rotation Control System (Zone CAV Rotation Control) of Information Storage Medium (Optical Disc)

Information storage medium (optical disc) 9 is mounted on turn table 221 which is rotated by the driving force of spindle motor 204. The rotational speed (rotational velocity) of information storage medium 9 is detected based on a reproduction signal obtained from information storage medium 9. That is, the detection signal (analog signal) output from amplifier 213 is converted into a digital signal by binarization circuit 212, and PLL (Phase Lock Loop) circuit 211 generates a constant period signal (reference clock signal) based on that digital signal. Information storage medium rotational speed detection circuit 214 detects the rotational speed of information storage medium 9 using this signal, and outputs the detection value.

A correspondence table of the information storage medium rotational speed which corresponds to the radial position where data is reproduced or recorded/erased on information storage medium 9 is pre-stored in semiconductor memory 219. When a reproduction position or record/erase position is determined, controller 220 sets a target rotational speed of information storage medium 9 by looking up information recorded in semiconductor memory 219, and sends that value to spindle motor driving circuit 215.

Spindle motor driving circuit 215 calculates the difference between this target rotational speed and the output signal (current rotational speed) of information storage medium rotational speed detection circuit 214, and supplies the driving current corresponding to that difference to spindle motor 204, thus controlling the rotational speed of spindle motor 204 to be constant. The output signal from information storage medium rotational speed detection circuit 214 is a pulse signal having a frequency corresponding to the rotational speed of information storage medium 9, and spindle motor driving circuit 215 controls both the frequency and pulse phase of this signal.

2-2B. Rotation Control System (CLV Rotation Control) of Information Storage Medium (Optical Disc)

Information storage medium (optical disc) 9 is mounted on turn table 221 which is rotated by the driving force of spindle motor 204. The rotational speed (rotational velocity) of information storage medium 9 is detected based on a reproduction signal obtained from a wobbled groove region (143 in FIG. 12 or the like) present on information storage medium 9. That is, the detection signal (analog signal) output from focus/track error detection circuit 217 is converted into a digital signal by a binarization circuit (not shown) in information storage medium rotational speed detection circuit 214, thus generating a constant period signal (reference signal). Rotational speed detection circuit 214 detects the rotational speed of information storage medium 9 using this reference signal, and outputs a difference signal corresponding to the frequency/phase difference between that detection value and a reference clock signal. Based on this difference signal output value, spindle motor driving circuit 215 supplies a predetermined driving current to spindle motor 204 to make control to attain a constant linear velocity (CLV).

2-3. Optical Head Moving Mechanism

To move optical head 202 in the radial direction of information storage medium 9, optical head moving mechanism (feed motor) 203 is equipped.

3. Functions of Respective Control Circuits 3-1. Focused Beam Spot Trace Control In order to perform focus or track error correction, a circuit for supplying a driving current to an objective lens actuator (not shown) in optical head 202 in accordance with the output signal (detection signal) from focus/track error detection circuit 217 is arranged. This circuit is objective lens actuator driving circuit 218. This circuit 218 includes a phase compensation circuit for improving characteristics in correspondence with the frequency characteristics of the objective lens actuator to attain quick response of objective lens movement up to the high frequency range.

In response to a command from controller 220, objective lens actuator driving circuit 218 executes:

an ON/OFF process of focus/track error correction operation (focus/track loop);

a process for moving the objective lens at low speed in a direction (focus direction) perpendicular to information storage medium 9 (executed when focus/track loop is OFF); and a process for moving a focused beam spot to a neighboring track by slightly moving in the radial direction (direction to cross tracks) of information storage medium 9 using a kick pulse.

4. Various Operations Associated with Control System of Mechanism Portion 4-1. Startup Control When information storage medium (optical disc) 9 is mounted on turn table 221 and startup control is started, the processes are executed in accordance with the following sequence.

1) Controller 220 sends a target rotational speed to spindle motor driving circuit 215, which supplies a driving current to spindle motor 204, thus starting rotation of spindle motor 204.

2) At the same time, controller 220 issues a command (execution command) to feed motor driving circuit 216, which supplies a driving current to optical head driving mechanism (feed motor) 203, thus moving optical head 202 to the innermost peripheral position of information storage medium 9. At that time, it is confirmed if optical head 202 has reached an inner peripheral portion beyond the information recording region on information storage medium 9.

3) When spindle motor 204 has reached the target rotational speed, that status (status report) is output to controller 220.

4) Semiconductor laser driving circuit 205 supplies a current to the semiconductor laser element in optical head 202 in correspondence with a reproduction light amount signal sent from controller 220 to recording/reproduction/erase control waveform generation circuit 206, thus starting laser emission.

Note that an optimal irradiation light amount upon reproduction varies depending on the types of information storage media (optical discs) 9. Upon startup, the lowest irradiation light amount value of those values is set.

5) The objective lens (121 in FIG. 2) in optical head 202 is moved to a position farthest from information storage medium 9, and objective lens actuator driving circuit 218 is controlled to make the objective lens slowly approach information storage medium 9.

6) At the same time, focus/track error detection circuit 217 detects a focus error amount, and outputs status to controller 220 when the objective lens has reached near an in-focus position.

7) Upon receiving that status, controller 220 issues a command to objective lens actuator driving circuit 218 to enable the focus loop.

8) Controller 220 issues a command to feed motor driving circuit 216 while the focus loop is ON to slowly move optical head 202 toward the outer periphery of information storage medium 9.

9) At the same time, a reproduction signal from optical head 202 is monitored, and when optical head 202 has reached the recording region on information storage medium 9, controller 220 stops movement of optical head 202, and issues a command to objective lens actuator driving circuit 218 to enable the track loop.

10) An "optimal light amount upon reproduction" and "optimal light amount upon recording/erase" recorded on the inner peripheral portion of information storage medium (optical disc) 9 are reproduced, and are recorded in semiconductor memory 219 via controller 220.

11) Furthermore, controller 220 sends a signal corresponding to that "optimal light amount upon reproduction" to recording/reproduction/erase control waveform generation circuit 206, thus re-setting the emission amount of the semiconductor laser element upon reproduction.

12) The emission amount of the semiconductor laser element upon recording/erase is set in correspondence with the "optimal light amount upon recording/erase" recorded on information storage medium 9.

4-2. Access Control 4-2-1. Reproduction of Access Destination Information on Information Storage Medium 9

Information that indicates locations and contents of information recorded on storage medium 9 varies depending on the types of information storage medium 9, and is generally recorded in directory management regions, navigation packs, or the like in information storage medium 9. Note that the directory management regions are recorded together in the inner or outer peripheral region of information storage medium 9. On the other hand, the navigation pack is contained in a VOBS (Video Object Set) complying with the data structure of a PS (Program Stream) of MPEG2, and records information indicating the location of the next video data.

When specific information is to be reproduced or recorded/erased, information in the above-mentioned region (information indicating the locations and contents of information recorded) is reproduced, and an access destination is determined based on the reproduced information.

4-2-2. Coarse Access Control

Controller 220 calculates the radial position of the access destination, and detects the distance between that position and the current position of optical head 202. As for the moving distance of optical head 202, velocity curve information that allows the head to reach the target position within a shortest period of time is stored in advance in semiconductor memory 219. Controller 220 reads that information, and controls movement of optical head 202 by the following method in accordance with the velocity curve.

More specifically, controller 220 issues a command to objective lens actuator driving circuit 218 to disable the track loop, and then controls feed motor driving circuit 216 to start movement of optical head 202. When the focused beam spot has crossed a track on information storage medium 9, focus/track error detection circuit 217 generates a track error detection signal. Using this track error detection signal, the relative velocity of the focused beam spot with respect to information storage medium 9 can be detected. Feed motor driving circuit 216 calculates the difference between the relative velocity of the focused beam spot obtained from focus/track error detection circuit 217, and target velocity information sent from controller 220, and feeds back that result to the driving current to be supplied to optical head driving mechanism (feed motor) 203, thus moving optical head 202.

In "optical head moving mechanism (feed motor) 203" mentioned above, a frictional force always acts between a guide shaft and bushing or bearing (not shown). When the optical head moves at high speed, dynamic friction acts. However, since the moving velocity of optical head 202 is low at the beginning of movement and immediately before stop, static friction acts. At that time, since the relative frictional force increases, the amplification factor (gain) of a current to be supplied to optical head driving mechanism (feed motor) 203 is increased in response to a command from controller (especially, immediately before stop).

4-2-3. Fine Access Control

When optical head 202 has reached the target position, controller 220 issues a command to objective lens actuator driving circuit 218 to enable the track loop. The focused beam spot reproduces an address or track number of that portion while tracing along a track on information storage medium 9. The current focused beam spot position is detected from that address or track number, and controller 220 calculates the number of error tracks from the reached target position and informs objective lens actuator driving circuit 218 of the number of tracks required to move the focused beam spot. When objective lens actuator driving circuit 218 generates a pair of kick pulses, the objective lens slightly moves in the radial direction of information storage medium 9, thus moving the focused beam spot to the neighboring track.

In objective lens actuator driving circuit 218, the track loop is temporarily disabled, and after kick pulses are generated a given number of times corresponding to the information from controller 220, the track loop is enabled again. Upon completion of fine access, controller 220 reproduces information (address or track number) at the position where the focused beam spot traces, and confirms if it has accessed a target track.

4-3. Continuous Recording/Reproduction Erase Control

As shown in FIG. 6, a track error detection signal output from focus/track error detection circuit 217 is input to feed motor driving circuit 216. "Upon startup control" and "upon access control" mentioned above, controller 220 controls feed motor driving circuit 216 not to use the track error detection signal. After it is confirmed that the focused beam spot has reached the target track by access, some components of the track error detection signal are supplied as a driving current to optical head driving mechanism (feed motor) 203. This control continues during the period in which a reproduction or recording/erase process is done continuously.

Note that information storage medium 9 is mounted so that its central position has a slight eccentricity from that of turn table 221. When some component of the track error detection signal are supplied as a driving current, entire optical head 202 slightly moves in correspondence with the eccentricity. When the reproduction or recording/erase process is continuously done for a long period of time, the focused beam spot position gradually moves toward the outer or inner periphery. When some components of the track error detection signal are supplied as a driving current to optical head moving mechanism (feed motor) 203, optical head 202 gradually moves toward the outer or inner periphery in correspondence with that current. In this manner, the load on track error correction of the objective lens actuator is reduced, thus attaining a stable track loop.

4-4. End Control

When a series of processes are complete and the operation is to be ended, the process is done in accordance with the following sequence. That is, 1) controller 220 issues a command to objective lens actuator driving circuit 218 to disable the track loop;

2) controller 220 issues a command to objective lens actuator driving circuit 218 to disable the focus loop;

3) controller 220 issues a command to recording/reproduction/erase control waveform generation circuit 206 to stop emission of the semiconductor laser element; and 4) controller 220 informs spindle motor driving circuit 215 of zero reference rotational speed.

5. Flow of Recording Signal/Reproduction Signal to Information Storage Medium 5-1. Signal Format Recorded on Information Storage Medium 9

In order to meet requirements:

of correcting recording information errors caused by defects on information storage medium 9;

of simplifying a reproduction processing circuit by setting zero DC component of a reproduction signal; and of recording information at highest possible density on information storage medium 9 for a signal to be recorded on information storage medium 9, the information recording/reproduction unit (physical system block) performs "addition of an error correction function" and "signal conversion of recording information (signal modulation/demodulation)", as shown in FIG. 6.

5-2. Flow of Signal Upon Recording 5-2-1. ECC (Error Correction Code) Appending Process Information to be recorded on information storage medium 9 is input to data input/output interface 222 as recording signal d in the form of a raw signal. This recording signal d is directly recorded in semiconductor memory 219, and then undergoes an ECC appending process, as described above, in ECC encoding circuit 208.

Upon completion of appending of inner-code PI and outer-code PO, ECC encoding circuit 208 reads data for one sector from semiconductor memory 219, and transfers the read data to modulation circuit 207.

5-2-2. Signal Modulation

In order to make a DC component (DSV: Digital Sum Value) of a reproduction signal approach 0 (zero), and to record information on information storage medium 9 at high density, signal modulation as conversion of a signal format is done in modulation circuit 207. Modulation circuit 207 and demodulation circuit 210 include a conversion table indicating the relationship between a source signal and modulated signal. The signal transferred from ECC encoding circuit 208 is segmented into data each consisting of a plurality of bits in accordance with a modulation scheme, and the segmented data are converted into other signals (codes) by looking up the conversion table.

For example, when 8/16 modulation (RLL (2, 10) code) is used as the modulation scheme, two different types of conversion tables are present, and the conversion table to be looked up is switched as needed to make the DC component (DSV) after modulation approach zero.

5-2-3. Recording Process on Information Storage Medium 9

Semiconductor laser driving circuit 205 operates to record information from optical head 202 on information storage medium 9. At this time, as shown in FIG. 1 and (b) of FIG. 2, recording marks 127 are continuously formed along tracks 112 for respective continuous data recording units 110, and gaps 111 are formed between neighboring continuous data recording units 110.

Figure 8:
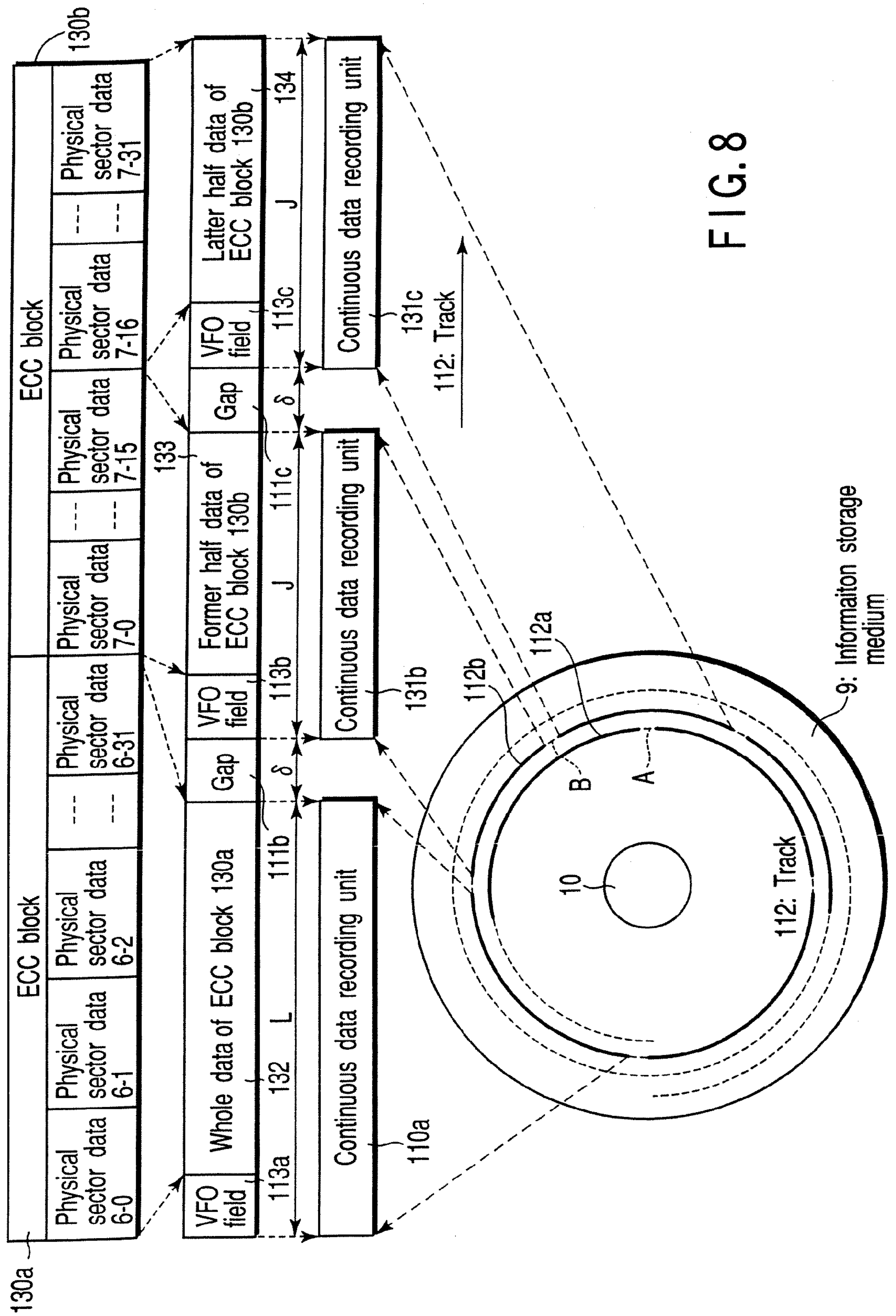
FIG. 8 is a view for explaining a data recording method on an information storage medium (recordable optical disc using a blue laser) according to another embodiment of the present invention.

Note that each continuous data recording unit (110, 131) is made up of one whole ECC block (130*a*) or a fraction of an integer (e.g., 133 or 134 in FIG. 8) of one ECC block (130*b*), as shown in FIG. 8. Note that "a fraction of an integer of one ECC block" indicates a case wherein one ECC block (130*b*) contains a plurality of physical sectors (e.g., 7-0 to 7-31 in FIG. 8), and a fraction of an integer of the plurality of physical sectors (7-0 to 7-15 or 7-16 to 7-31; ½ in this case) form one continuous data recording unit (133 or 134).

5-3. Flow of Signal Upon Reproduction 5-3-1. Binarization/PLL Circuit

As described in "signal detection by optical head 202", a change in amount of light reflected by the light reflection film or light reflective recording film of information storage medium (optical disc) 9 is detected to reproduce a signal on information storage medium 9. Binarization circuit 212 converts that signal into a binary digital signal consisting of "1" and "0" using a comparator.

From the reproduction signal obtained by the binarization circuit, PLL circuit 211 extracts a reference signal upon reproducing information. PLL circuit 211 incorporates a variable frequency oscillator. The frequency and phase of a pulse signal (reference clock) output from the oscillator are compared with those of the output signal from the binarization circuit 212, and the comparison results are fed back to the oscillator output.

5-3-2. Signal Demodulation

Demodulation circuit 210 incorporates a conversion table (not shown) indicating the relationship between modulated and demodulated signals. A modulated signal is restored to an original signal by looking up the conversion table in synchronism with the reference clock obtained by PLL circuit 211. The restored (demodulated) signal is recorded in semiconductor memory 219.

5-3-3. Error Correction Process

Error correction circuit 209 detects any errors of a signal saved in semiconductor memory 219 using inner-code PI and outer-code PO, and sets pointer flags of error positions. After that, error correction circuit 209 corrects a signal at the error positions in accordance with the error pointer flags while reading out the signal from semiconductor memory 219, removes inner-code PI and outer-code PO, and transfers the signal to data input/output interface 222. A signal sent from ECC encoding circuit 208 is output as reproduction signal c from data input/output interface 222.

Parameters used in the control sequences of respective processes and the respective processes in the apparatus shown in FIG. 6 are written in control program/parameter ROM 220*b* in controller 220 as firmware. A microprocessing unit MPU (not shown) of controller 220 executes a control program in ROM 220*b* using worm RAM 220*a* as a work area, thus executing the aforementioned processes.

The format process sequence executed in the apparatus shown in FIG. 6 will be explained below using the flow chart shown in FIG. 7. This process is executed in ECC encoding circuit 208 shown in FIG. 6, and detailed control is made by controller 220. FIG. 7 shows the sequence of the data conversion process (format conversion process) shown in FIGS. 3 to 5.

Initially, physical sector information is set (step ST1). With this setting, a plurality of pieces of physical sector information 4-0 to 4-31 ((c) of FIG. 3) are set (segmented into main data in units of 2048 bytes). In this case, the plurality of pieces of physical sector information 4-0 to 4-31 are set in correspondence with the size of a plurality of pieces of logical sector information 3-0 to 3-31 ((b) of FIG. 3). That is, user data to be recorded is handled in units of 2048 bytes.

Subsequently, a 2068-byte data sector is generated from 2048-byte main data, 16-byte auxiliary data, and a 4-byte error detection code (EDC) (step ST2). Note that the 16-byte auxiliary data contains 4-byte data ID data (PID), a 2-byte error detection code (IED) for the data ID, and 10-byte reserve data (RSV).

Note that the PID records a sector number used to identify a data sector, and sector information used to identify the contents of the data sector. The IED is used to detect any errors generated in the PID portion. The RSV is used to record other kinds of auxiliary information (e.g., copyright management information). The EDC is used to detect any errors generated in 2064-byte main data and auxiliary data. The data sectors are arranged in a 188 (columns)×11 (rows) matrix.

Scramble data is added to 2048-byte main data of each data sector (step ST3).

Data sector rows are re-arranged depending on whether the sector number is even or odd (step ST4).

A sector block is generated by vertically stacking 32 continuous data sectors, which are re-arranged depending on their sector numbers (step ST5). The data sectors which are vertically stacked are arranged in a 376 (columns)×176 (rows) matrix.

The sector block is horizontally segmented into two blocks to encode error correction codes (step ST6). Note that the 188 (columns)×176 (rows) blocks after segmentation undergo encoding in the column direction to generate outer-code parity data (PO) for 16 rows. This outer code uses a REED Solomon code of RS(192, 176, 17). Subsequently, inner-code encoding is done in the row direction to generate inner-code parity data (PI) for 12 columns. This inner code uses a REED Solomon code of RS(200, 188, 13).

The ECC block undergoes row interleave to distribute 16 right and left rows of PO data into the block (step ST7; see FIG. 5). In this case, 32 rows (=16×2) of PO data are distributed row by row to sectors. At this time, PO rows of the left block of the two horizontally segmented blocks are inserted after the lowermost row of an odd sector consisting of only five rows, and PO rows of the right block of the two horizontally segmented blocks are inserted after the lowermost row of an even sector consisting of only five rows.

With the aforementioned process, physical sector data is completed (step ST8).

Subsequently, zigzag recording across two rows is done (step ST9).

A modulation process is executed (step ST10). In this case, if a bit sequence of data to be recorded is directly recorded on medium 9, the characteristic feature of the recording data sequence does not match the recording characteristics of medium 9, and efficient recording cannot be done. In consideration of the recording characteristics of medium 9, a data pattern is converted according to a predetermined conversion rule. For example, the modulation scheme includes an 8/16 modulation scheme for converting 1-byte data into a 16-bit pattern, an 8/12 modulation scheme for converting 1-byte data into a 1.5-byte pattern, a 12/18 modulation scheme for converting 12-bit data into an 18-bit pattern, and the like. Any one of these schemes comprises a plurality of conversion tables and a logic circuit for selecting the conversion table. Especially, since the 12/18 modulation scheme that converts 1.5-byte data has a characteristic of expanding an error at one position to 1.5 bytes, it is effective for the process executed in step ST9 to distribute errors upon reproduction.

Via steps ST1 to ST10, zigzag recording according to the setup in step ST9 is done for medium 9. In this recording, data recording is continuously done for respective continuous data recording units 110, as shown in FIG. 1. In this case, recording is controlled to form gaps 111 with length δ between neighboring continuous data recording units 110.

FIG. 8 is a view for explaining the data recording method on the information storage medium (recordable optical disc using a blue laser) according to another embodiment of the present invention.

The physical data length of recording information 114 in FIG. 1 nearly matches the data length (the length of ECC block 130*a* in FIG. 8) after modulation of data of the ECC block shown in FIGS. 3 and 4, as described above.

When a radial position where the length per round of information storage medium 9 matches an integer multiple of length L+δ has been reached, ECC block 130*b* is segmented into two blocks, and continuous data recording unit 131*b* which is obtained by appending VFO field 113*b* to former half data 133 of ECC block 130*b* to have physical length J is recorded in the direction of tracks 112.

Gap 111*c* with length δ is formed after such continuous data recording unit 131*b*, and continuous data recording unit 131*c* obtained by appending VFO field 113*c* to latter half data 133 of ECC block 130*b* to have physical length J is recorded after gap 111*c* in the direction of tracks 112. As can be seen from FIG. 8, since length "δ+J+δ+J" is different from length L+δ, gaps 111 do not come to neighboring positions between neighboring tracks (112*a* and 112*b*) at that radial position (the radial positions of tracks 112*a* and 112*b* in FIG. 8).

In FIG. 8, the half of data obtained by modulating ECC block 130*b* is recorded and arranged in continuous data recording unit 131. However, the scope of the present invention is not limited to this. For example, a plurality of arbitrary physical sector data (7-0 to 7-15 and 7-16 to 7-31 in the example in FIG. 8) may be recorded and arranged, or a plurality of ECC blocks 130 may be recorded and arranged together in single continuous data recording unit 131.

Figure 9:
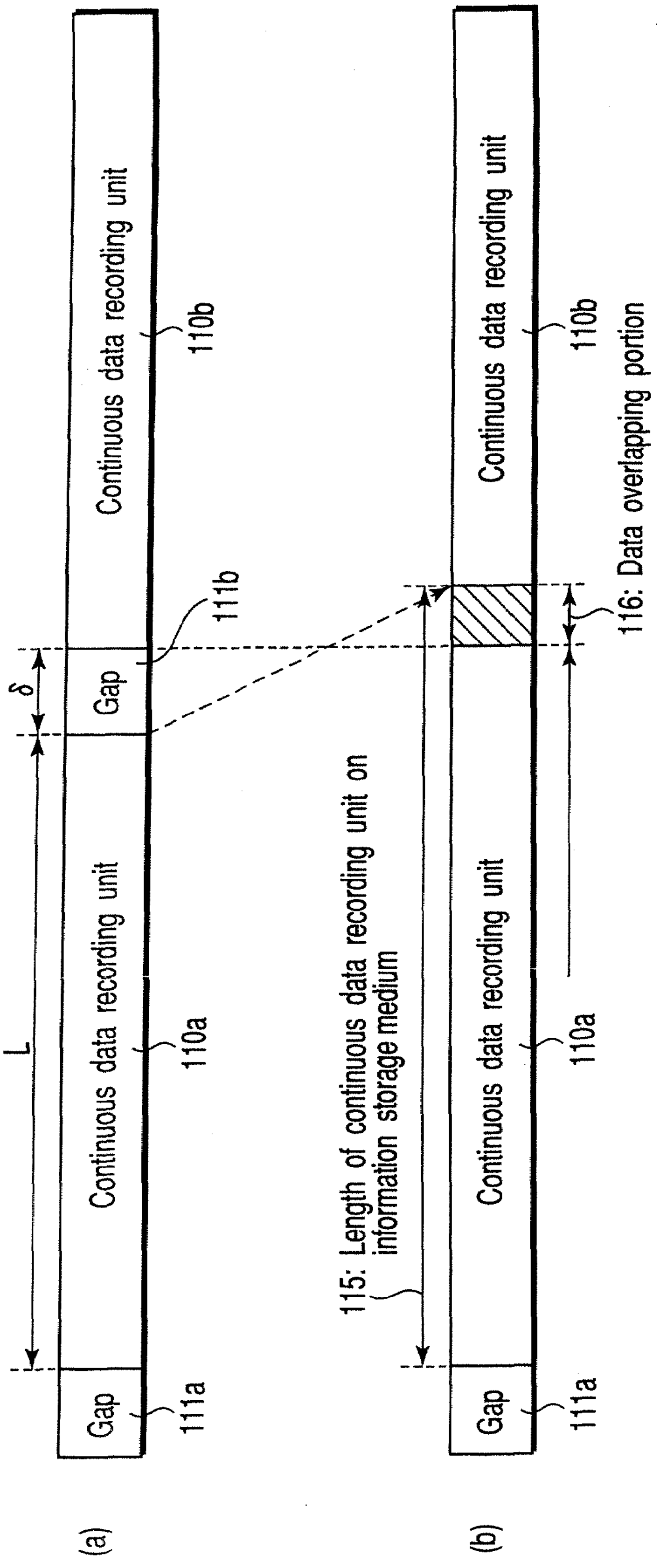
FIG. 9 is a view for explaining necessity of a gap (groove gap) in the information storage medium according to the present invention.

FIG. 9 is a view for explaining necessity of gaps (groove gaps) δ in the information storage medium according to the present invention.

A problem posed when δ assumes too small a value will be explained below using FIG. 9. When spindle motor 204 shown in FIG. 6 is free from any rotation nonuniformity (ideal state), pairs of continuous data recording units 110 and gaps 111 are recorded along tracks 112 without any variations of length (L+δ), as shown in (a) of FIG. 9. However, when the rotational speed of spindle motor 204 locally increases (due to rotation nonuniformity), the end position of continuous data recording unit 110*a* shifts backward, and gap 111*b* is narrowed down. Furthermore, in the worst case, the end position of continuous data recording unit 110*a* may enter the head position of continuous data recording unit 110*b* that has already been recorded at the subsequent location, and data overlap portion 116 may be generated.

When recording layers 122 and 123 of information storage medium 9 are made up of a phase-change type recording film, data overlap portion 116 is overwritten by rear data of leading continuous data recording unit 110*a*, and first data of continuous data recording unit 110*b* is destroyed.

Figure 12:
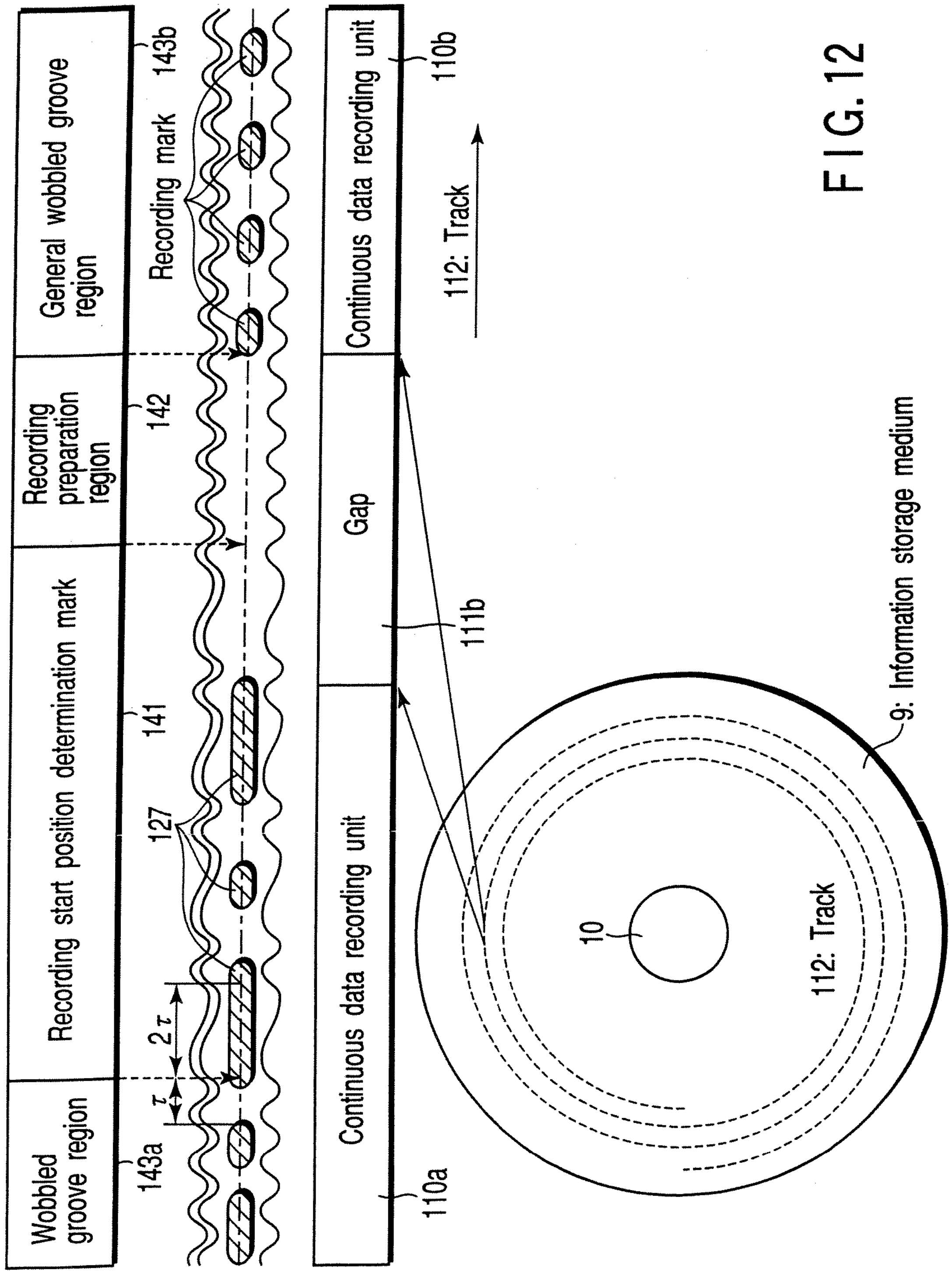
FIG. 12 is a view for explaining an information storage medium formed with a mark that determines a recording start position according to still another embodiment of the present invention.

Rotation control of spindle motor 204 is made using a wobble signal obtained from wobbled groove 143 shown in FIG. 12. Therefore, let f be the rotation nonuniformity amount of spindle motor 204, and τ be the wobble period of wobbled groove 143. Then, the shift amount of last data of continuous data recording unit 110*a* due to rotation nonuniformity of spindle motor 204 is given by "τf".

Therefore, in order to avoid the problem resulting from the data overlap portion shown in (b) of FIG. 9, length δ of gap 111 must be set to satisfy:

$$\delta \geqq \tau f \tag{7}$$

The rotation nonuniformity amount of spindle motor 204 (the practical rotation nonuniformity amount, including the influence of eccentricity, of optical disc 9, which is actually set on table 221 rotated by motor 204) normally depends on the eccentricity of information storage medium 9. If the eccentricity of information storage medium 9 is ±100 μm, rotation nonuniformity amount f due to this eccentricity is around 0.1%. In this case, inequality (7) is rewritten as:

$$\delta \geqq 0.001\tau \tag{8}$$

Inequality (7) or (8) can define the lower limit of gap δ, and inequality (4), (5), or (6) mentioned above can define the upper limit of gap δ.

Note that the value of gap δ, the lower limit of which is defined by inequality (7) or (8) cannot often satisfy inequality (6) ($\delta \leqq D/4$ or $\delta \leqq t \tan\{\sin^{-1}(NA/n)\}/2$) mentioned above due to (practical) rotation nonuniformity of spindle motor 204 or other factors. A measure against such case will be explained below.

As described above in (b) of FIG. 2, when long gap regions 111 with length δ align in the radial direction of information storage medium 9, inter-layer crosstalk takes place. This inter-layer crosstalk becomes conspicuous with increasing length δ of gap 111 (if δ=0, no inter-layer crosstalk due to gaps 111 occurs). Hence, if length δ of gaps 111 cannot be shortened due to rotation nonuniformity or the like, the positions of gaps 111 shift, i.e., gaps 111 are arranged at non-neighboring positions between neighboring tracks, thus reducing inter-layer crosstalk. One of examples of such position shift methods of gaps 111 has already been explained with reference to FIG. 8. In addition, as an example of the position shift method of gaps 111, a method shown in FIG. 10 is available.

FIG. 10 shows an application (modification) of FIG. 8. In FIG. 8, the physical periodic length of gaps 111 is changed to lay out gaps 111 at non-neighboring positions between neighboring tracks (112*a* and 112*b*). Alternatively, in FIG. 10, the physical periodic length of gaps 111 is not macroscopically changed, but the position of gap 111 is shifted at only a position where gaps may be located at neighboring positions between neighboring tracks (112*a* and 112*b*).

In FIG. 10, at many locations in information storage medium 9, each ECC block 130*b* is segmented into two blocks, 16 sectors from physical sectors 7-0 to 7-15 are assigned to continuous data recording unit 131*b* as former half data 133 of ECC block 130*b*, and another 16 sectors from physical sectors 7-16 to 7-31 are assigned to continuous data recording unit 131*c* as latter half data 134 of ECC block 130*b*.

At the radial position (that satisfies inequality (7)) of information storage medium 9 at which gaps 111 are located at neighboring positions (position of point A) between neighboring tracks with this layout method, the position of gap 111*e* is shifted to the position of point B.

That is, at this location (position of point B), 15 sectors from physical sectors 8-1 to 8-14 are assigned to continuous data recording unit 137 as former half data 133 of ECC block 130*c*. As a result, the physical length of continuous data recording unit 137 is shortened from "J" to "J−α". At the same time, 17 sectors from physical sectors 8-15 to 8-31 are assigned to continuous data recording unit 138 as latter half data 134 of ECC block 130*c*. As a result, the physical length of continuous data recording unit 132 is prolonged from "J" to "J+α". As a result, the position of gap 111*e* is shifted.

In this way, the numbers of sectors to be stored in continuous data recording units 137 and 138 are changed before and after gap 111*e* (i.e., the total length of continuous data recording units 137+138 remains the same, but the lengths of continuous data recording units 137 and 138 are changed by ±α), thus shifting the position of gap 111*e* from a neighboring position of point A to point B.

In the embodiment shown in FIG. 8, data obtained by segmenting ECC block 130 into 1/M data is assigned to one of continuous data recording units 131 to 133. In the embodiment shown in FIG. 10, ECC block 130 is segmented into two data (M=2), which are assigned to the continuous data recording units. However, this embodiment is not limited to this, and other values such as 4, 8, 16, and the like may be used as the value M.

The aforementioned conditions of inequalities (4) to (6) are met only when gaps 111 align in the radial direction, as shown in (b) of FIG. 2. Let L be the physical length of continuous data recording unit 110 in the direction along tracks 112 of information storage medium 9. Then, the condition of inequality (6) is satisfied only when the center of laser beam 120 traces a position of radius $r_0$ which satisfies:

$$N(L+\delta)=2\pi r_0 \tag{9}$$

with respect to integer value N.

Figure 11:
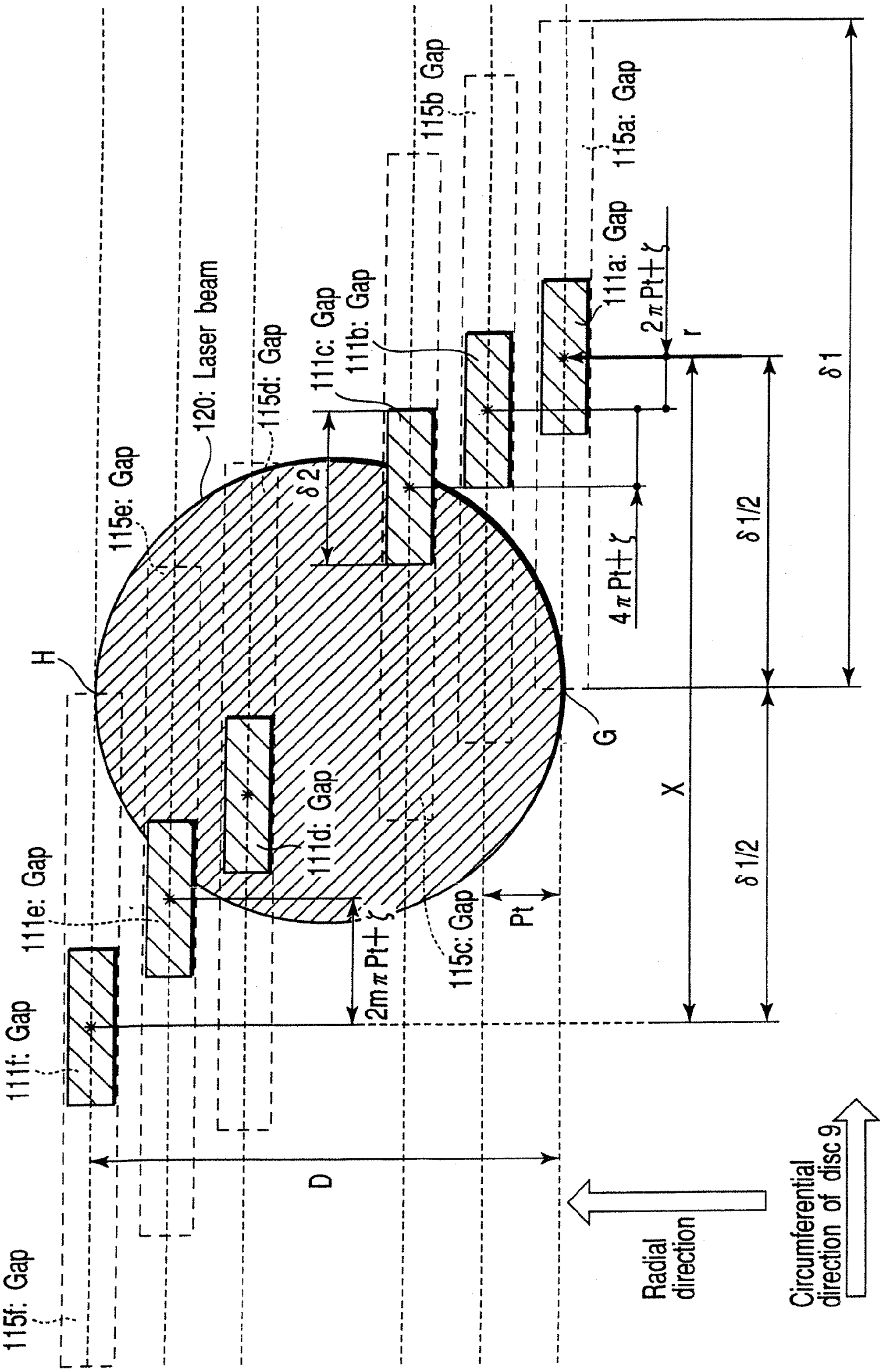
FIG. 11 is a view for explaining the maximum allowable range of gaps (groove gaps) on the information storage medium according to the present invention.

However, at the position of radius r ($r \neq r_0$), since we generally have:

$$N(L+\delta)=2\pi r-\zeta \tag{10}$$

the positions of gaps 111 do not align but shift from each other, as shown in FIG. 11.

FIG. 11 is a view for explaining the maximum allowable range of gaps (groove gaps) on the information storage medium according to the present invention.

The embodiment of the present invention adopts CLV (Constant Linear Velocity) as the recording method. In FIG.

11, the central position of gap 111 or 115 at the position of radius r of information storage medium 9 will be considered as a reference.

Let Pt be the track pitch. Then, the shift amount between the central positions of gaps 111 or 115 on neighboring tracks in the direction along the tracks (in the circumferential direction of information storage medium 9) is given by:

$$2\pi Pt+\zeta \quad (11)$$

In FIG. 11, the shift amount of the central position of gap 111 or 115 at the m-th track position counted from a track with radius r from the gap central position at the immediately preceding track position is given by:

$$2\pi Pt\cdot m+\zeta \quad (12)$$

For this reason, total shift amount X from the reference position (central position of gap 111 or 115 at the position of radius r) is given by:

$$X=\Sigma\{2\pi Pt\cdot m+\zeta\} \quad (13)$$

As in the case of (b) of FIG. 2, the spot diameter of laser beam 120 that causes the influence of inter-layer crosstalk is also D in FIG. 11. Since the number of tracks included within length D is D/Pt, the total of equation (13) is obtained by calculating the sum from m=0 to m=D/Pt and is given by:

$$\begin{aligned} X &= \pi Pt(D/Pt)(D/Pt+1)+\zeta D/Pt \\ &= \{\pi(D+Pt)+\zeta\}D/Pt \end{aligned} \quad (14)$$

If gaps 111*a* to 111*f* with sufficiently small length δ2 are present in FIG. 11, the influence of inter-layer crosstalk may be relatively small. By contrast, if gaps 115*a* to 115*f* with sufficiently large length δ1 are present, no recording mark is present within most of the area in laser beam 120 in the state shown in FIG. 11, and large inter-layer crosstalk appears.

As shown in FIG. 11, when start position G of gap 115*a* located at the endmost position in laser beam 120, and end position H of gap 115*f* located at the opposite end position in laser beam 120 align in the radial direction (positions G and H nearly match in the circumferential direction), the influence of inter-layer crosstalk appears clearly. In this case, the distance from the central position of gap 115*a* to start position G is equal to that from the center of gap 115*f* to end position H, i.e., δ1/2. As a result, X=δ1 at that time and, from equation (14), we have:

$$\delta 1=\{\pi(D+Pt)+\zeta\}D/Pt \quad (15)$$

Therefore, since a condition that can reduce the influence of inter-layer crosstalk in the state shown in FIG. 11 is δ≦δ1, we have:

$$\delta\leqq\{\pi(D+Pt)+\zeta\}D/Pt \quad (16)$$

Since the average at every positions on information storage medium 9 is:

$$\zeta=(L+\delta)/2\approx L/2 \quad (17)$$

substitution of equation (17) into inequality (16) yields:

$$\delta\leqq\{\pi(D+Pt)+L/2\}D/Pt \quad (18)$$

In a minimum state, since ζ=0, inequality (16) is rewritten as:

$$\zeta\leqq\pi(D+Pt)D/Pt \quad (19)$$

That is, inequality (19) must be satisfied as the inter-layer crosstalk reduction that pertains to length δ of gaps.

FIG. 12 is a view for explaining an information storage medium formed with a mark that determines a recording start position according to still another embodiment of the present invention.

Recording start position determination mark 141 recorded on information storage medium 9 is reproduced by optical head 202 in FIG. 6, and is sent to focus/track error detection circuit 217 via amplifier 213. In focus/track error detection circuit 217, the presence/absence of mark 141 is detected as a given component of a track error detection signal. Note that the frequency of a detection signal obtained from recording start position determination mark 141 is much higher than that of the track error detection signal. For this reason, by frequency-separating these two signals, mark 141 can be easily detected. Since the two signals have a large frequency difference, the adverse influence of the presence of mark 141 on the track error detection signal can be reduced.

A wobbled pattern (repeated pattern of 2τ and τ) of the recording start position determination mark 141 portion is different from that (repeated pattern of τ alone) of a portion other than the mark. That is, the mark 141 portion has a unique wobbled pattern (a kind of address). For this reason, the detected "repeated pattern of 2τ and τ" can be reliably determined (specified) as mark 141.

Since the embodiment of the present invention records data using CLV, gaps 111 have different positions in the direction of rotation angle depending on radial positions of information storage medium 9, and the position of recording start position determination mark 141 in the direction of rotation angle shifts accordingly, as shown in FIG. 11. By exploiting this feature, the radial position of a location where the head currently traces can be detected by detecting only the position of recording start position determination mark 141 in the direction of rotation angle.

According to inequality (19) above, gap 111 or 115 must be set to have small physical length δ (δ1 or δ2 in FIG. 11). In this case, since gap 111 or 115 has sufficiently small physical length δ, when data of only one continuous data recording unit 110 is rewritten, the rewrite start position is required to have high precision. If the rewrite start position precision is low, the previous and next continuous data recording unit positions may be overwritten upon rewriting only one continuous data recording unit 110.

In order to assure this high precision, in the embodiment shown in FIG. 12, recording start position determination mark 141 is recorded in advance on medium (recordable optical disc) 9 in the form of wobble modulation. This is a great characteristic feature of the embodiment of the present invention.

This recording start position determination mark 141 has the following features:

(a) Wobble modulation for wobbling a pre-groove which has a continuous groove shape and forms track 112 to the right and left is made. The width of the pre-groove which is wobbled to the right and left is maintained constant everywhere.

<Comment on a> Since the groove width is constant everywhere, even when a focused reproduction laser beam is traced on recording start position determination mark 141, the reflectance of light from that mark can be maintained constant. Therefore, recording marks 127 can be directly formed on recording start position determination mark 141. Even when signal reproduction using a change in amount of light reflected by recording marks 127, which are directly formed on recording start position determination mark 141, is made, a reproduction signal is free from the influence of recording start position determination mark 141.

(b) Recording marks 127 corresponding to immediately preceding continuous data recording unit 110*a* can be recorded in at least a portion in recording start position determination mark 141. Alternatively, recording marks 127 can be recorded over whole recording start position determination mark 141.

<Comment on b> In order to improve the recording efficiency on information storage medium 9, the physical length of gap 111*b* is preferably reduced as much as possible. As shown in FIG. 12, when recording marks 127 corresponding to immediately preceding continuous data recording unit 110*a* can be recorded in at least a portion of recording start position determination mark 141, information recording is allowed on recording start position determination mark 141, thus improving the recording efficiency and increasing the recording capacity of the entire information storage medium.

(c) The macroscopic duty ratio of wobble modulation of wobbled groove region 143 is matched with that of recording start position determination mark 141.

<Comment on c> In wobbled groove region 143, the ratio of right and left portions of wobbles is always set at 50% using a sine waveform. Likewise, the right-and-left wobbling ratio of recording start position determination mark 141 by wobble modulation is maintained at 50%. As a result, generation of an offset to a track error detection signal at the position of recording start position determination mark 141 can be prevented.

For example, when the right wobbling period of recording start position determination mark 141 is macroscopically longer than the left wobbling period, even when just the center of track 112 (pre-groove) is traced, a track offset, which is detected as a track error signal by the push-pull method as if a slightly left portion of track 112 were traced, is generated.

(d) Recording start position determination mark 141 is formed by wobble modulation while assuring the reference frequency ($1/\tau$: slot interval $\tau/2$) of wobble groove region 143.

<Comment on d> In wobbled groove region 143 in FIG. 12, a groove is wobbled at period $\tau$. The distance from a position where the central position of a wobble is passed until the central position is crossed again is called a slot interval (having the same meaning as the channel bit interval in general data). Wobbled groove region 143 in FIG. 12 has a slot interval of $\tau/2$. The reference frequency upon recording, the reference frequency used in PLL (Phase Lock Loop) upon reproduction, or rotation synchronization control of spindle motor 204 executes PLL with reference to slot interval $\tau/2$ detected from this wobbled groove. If the reference frequency has changed within recording start position determination mark 141, PLL steps out in recording start position determination mark 141, and the recording/reproduction process and rotation control of the spindle motor become unstable. For this reason, the reference frequency in recording start position determination mark 141 is maintained constant to be $1/\tau$.

A pattern in recording start position determination mark 141 shown in FIG. 12 alternately repeats a wobble of period "$2\tau$" and that of period "t" as in wobbled groove region 143 for four cycles. In the wobbled portion having period "$2\tau$", the interval from when a wobble exceeds the center once until it passes the center again is just "$\tau$". Since this value corresponds to a value exactly twice slot interval $\tau/2$, slot interval $\tau/2$ (i.e., reference frequency $1/\tau$) is maintained unchanged in this region. As a result, PLL is kept enabled irrespective of inside or outside recording start position determination mark 141, and the recording/reproduction process and rotation control of the spindle motor can be stably done.

(e) Recording preparation region 142 is assured between recording start position determination mark 141 and the recording start position of continuous data recording unit 110*b*, so that the information recording/reproduction apparatus becomes ready to record while a focused beam spot passes by this recording preparation region 142.

<Comment on e> The S/N ratio of a wobble modulation signal obtained from the wobbled groove is very poor, and the probability that the start position of recording start position determination mark 141 is always detected is low. Hence, in the embodiment of the present invention, since a wobble with period "$2\tau$" and that with period "$\tau$" are alternately repeated for four cycles, the information recording/reproduction apparatus can find recording start position determination mark 141 somewhere in four cycles.

Once the information recording/reproduction apparatus can find a position within recording start position determination mark 141, the gate (detection window) of a high-performance position detection circuit is opened to detect the end position of recording start position determination mark 141 with high precision. Since the physical length of recording preparation region 142 is set to be a specific value in advance, if the end position of recording start position determination mark 141 is detected, the recording process is started after an elapse of a time interval required to pass recording preparation region 142, which is set at the specific value, thus forming recording marks 127 from the head position of continuous data recording unit 110*b*. In this manner, since recording preparation region 142 is laid out immediately after recording start position determination mark 141, the end position detection precision of recording start position determination mark 141 can be improved. As a result, the low head position detection precision can be allowed, and a price reduction of a wobble modulation detection circuit can be achieved. Since the end position detection precision of recording start position determination mark 141 is improved, the start position precision of continuous data recording unit 110*b* can be greatly improved compared to the prior art.

Note that the groove pattern of recording preparation region 142 in FIG. 12 has the same amplitude and period of that of wobbled groove region 143.

As the pattern of recording start position determination mark 141, a single wobble with period "$2\tau$" and a single wobble with period "$\tau$" are alternately repeated for four cycles, as shown in FIG. 12.

However, the number of times of repetition in recording start position determination mark 141 is not limited to four, but an arbitrary number of times of repetition can be selected. The pattern of recording start position determination mark 141 is not limited to that shown in FIG. 12, but an arbitrary pattern can be set as long as conditions (a) to (c) are satisfied within the scope (feature) of the present invention.

Figure 13:
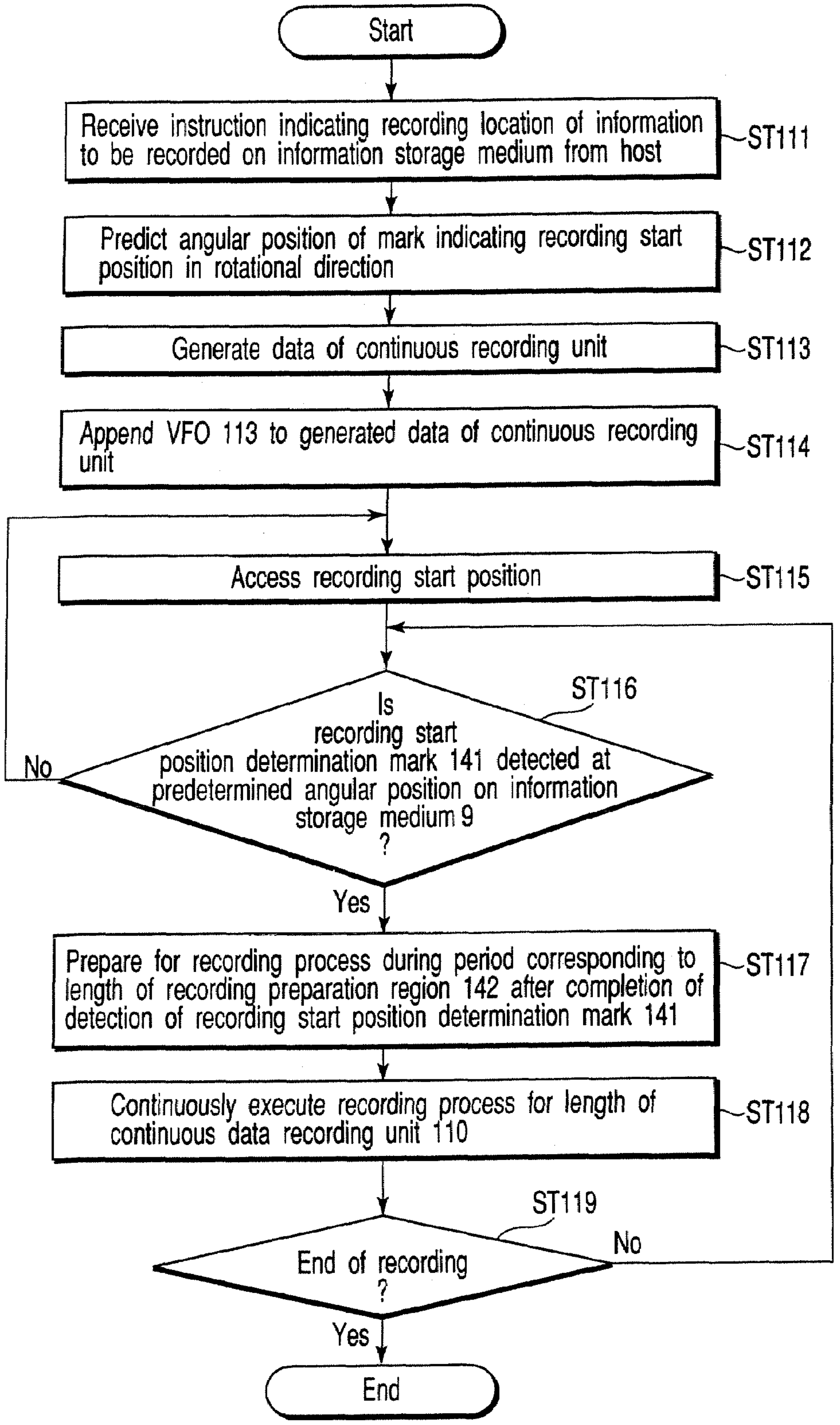
FIG. 13 is a flow chart for explaining a recording method or rewrite method in the information recording/reproduction apparatus according to the embodiment of the present invention.

A method of overwriting and/or additionally writing data on information storage medium 9 using recording start position determination mark 141 pre-recorded on information storage medium 9, as shown in FIG. 12, will be explained below with reference to FIG. 13.

Controller 220 in FIG. 6 receives an instruction indicating a position where information recording is to be done (i.e., recording location of recording information) on information storage medium 9 shown in FIG. 12 or 1 (step ST111).

Before information is recorded or rewritten on information storage medium 9, the position of recording start position determination mark 141 in the direction of rotation angle at the radial position where recording or rewrite is made is predicted on the basis of the recording location instructed in step ST111 (step ST112).

After the position of mark 141 is predicted, data (corresponding to recording information 114 in FIG. 1 or 133, 134 in FIG. 8/10) of continuous data recording unit 110 (131 in FIG. 8 or 137, 138 in FIG. 10) is generated (step ST113). VFO field 113 is appended to the head of data of continuous data recording unit 110 generated in this way (step ST114).

Subsequently, the recording start position (the position predicted in step ST112) is accessed (step ST115). In this access, it is determined if the unique pattern (repeated pattern of 2τ and τ) of recording start position determination mark 141 is detected at the predetermined angular position (the position predicted in step ST112) (step ST116), thus checking if the predetermined radial position has been reached, or if a track error has occurred during tracing. If mark 141 cannot be detected at the predetermined position (NO in step ST116), it is determined that access cannot reach the predetermined position or a track error has occurred during tracking, and the access process is executed again (step ST115).

As described above, in the example shown in FIG. 12, since an identical pattern (repeated pattern of 2τ and τ) is repeated four cycles as recording start position determination mark 141, the information recording/reproduction apparatus in FIG. 6 can find mark 141 somewhere in four cycles. If the information recording/reproduction apparatus finds a position within recording start position determination mark 141 (YES in step ST116), the gate (detection window) of a high-performance position detection circuit in the information recording/reproduction apparatus is opened to begin to prepare for detection of the end position of recording start position determination mark 141 with high precision (step ST117). That is, if the unique pattern of recording start position determination mark 141 is detected (YES in step ST116), recording preparation is made during a period which has a pattern end point of mark 141 as a start point and has a duration corresponding to the length of recording preparation region 142 (step ST117).

As shown in FIG. 12, since no wobble signal with period "2τ" appear within recording preparation region 142, the boundary region between recording start position determination mark 141 and recording preparation region 142 can be detected by utilizing this change in pattern.

Upon detection of the end position of recording start position determination mark 141 (boundary position between mark 141 and recording preparation region 142), the control waits for an elapse of a predetermined time interval (a period corresponding to the length of recording preparation region 142) required to pass recording preparation region 142, and a continuous recording process corresponding to the length of continuous data recording unit 110 is executed (step ST118).

During recording (NO in step ST119), steps ST115 to ST118 are repeated. If data to be recorded does not remain (YES in step ST119), the process in FIG. 13 ends.

Figure 14:
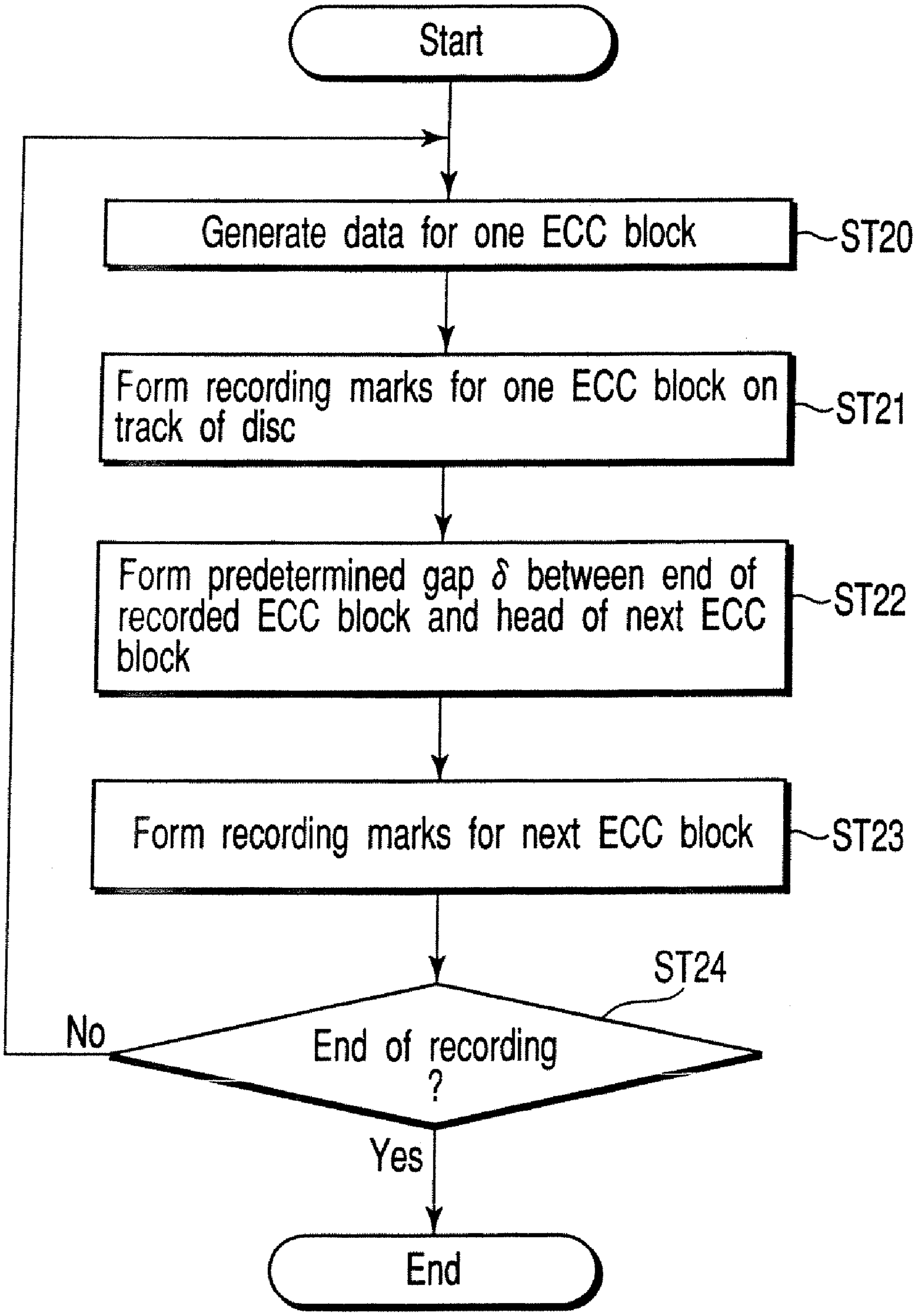
FIG. 14 is a flow chart for explaining a process for forming gap δ in the recording method according to the embodiment of the present invention.

FIG. 14 is a flow chart for explaining a forming process of gap δ in the recording method according to the embodiment of the present invention. In this recording method, optical disc 9 which has wobbled grooves along spiral tracks 112, and continuously undergoes data recording for respective recording units (ECC blocks) along tracks 112 while being rotated is used.

Data for one ECC block ((f), (g) of FIG. 4) is generated (step ST20), and recording marks 127 corresponding to the generated data are formed on track 112 of disc 9 (step ST21).

Gap δ (e.g., 111*d* in FIG. 10) is formed after the end of the recorded ECC block (e.g., 130*b* in FIG. 10), and the head of the next ECC block (e.g., 130*c* in FIG. 10) is laid out (step ST22). Recording marks 127 for the next ECC block (130*c*) are formed on track 112 (step ST23). The aforementioned operations (steps ST20 to ST23) are repeated during recording (NO in step ST24).

In the process shown in FIG. 14, when data recording is done (step ST23) while forming predetermined gap δ between neighboring ECC blocks along track 112 (step ST22), the recording system (202 to 208) and rotation driving system (204, 214, 215) in FIG. 6 are controlled so that gap δ satisfies "$\delta \geqq \tau f$" where τ is the wobble period of the wobbled groove and f is the allowable rotation nonuniformity of rotation driving.

Furthermore, the recording system (202 to 208) and rotation driving system (204, 214, 215) in FIG. 6 are controlled to satisfy at least one of inequalities (4) to (6), inequality (7) or (8), and inequality (19).

Note that the present invention is not limited to the aforementioned embodiments, and various modifications may be made without departing from the scope of the invention when it is practiced. The respective embodiments may be combined as needed as long as possible, and combined effects can be obtained in such case.

Furthermore, the embodiments include inventions of various stages, and various inventions can be extracted by appropriately combining a plurality of required constituent elements disclosed in this application. For example, even when some required constituent elements are deleted from all the required constituent elements disclosed in the embodiments, the deleted elements are compensated for as needed by known techniques when the extracted invention is practiced.

GIST OF RESPECTIVE EMBODIMENTS

[Basic Point]

Data are continuously recorded for respective ECC blocks (recording units) along tracks 112 on information storage medium 9, and gaps δ are formed between neighboring ECC blocks (recording units) along tracks 112 (FIGS. 1, 12, and the like).

[Peripheral Point]

(a) An allowable minimum value that δ can assume is specified (inequality (8) and the like);

(b) An allowable maximum value that δ can assume is specified (inequality (6) and the like); and (c) When the allowable maximum value that δ can assume is exceeded, the gap positions of neighboring recording units are shifted between neighboring tracks (FIGS. 8, 10, and the like).

As described above, according to the embodiments of the present invention, the following effects can be obtained in correspondence with the following arrangements.

<1A> An information storage medium which has a wobbled groove along spiral tracks (112) and continuously undergoes data recording for respective predetermined recording units (ECC blocks) along the tracks (112) while being rotated, characterized in that the continuous data recording can be done to form a predetermined gap δ between the neighboring predetermined recording units (ECC blocks) along the tracks (112), and the predetermined gap δ satisfies "$\delta \geqq \tau f$" where τ is the wobble period of the wobbled groove and f is the allowable rotation nonuniformity of rotation.

<1B> An information recording method that uses an information storage medium which has a wobbled groove along spiral tracks (112) and continuously undergoes data recording for respective predetermined recording units (ECC blocks) along the tracks (112) while being rotated, characterized in that upon executing the continuous data recording to form a predetermined gap δ between the neighboring predetermined recording units (ECC blocks) along the tracks (112), the predetermined gap δ satisfies "$\delta \geqq \tau f$" where τ is the wobble period of the wobbled groove and f is the allowable rotation nonuniformity of rotation.

<1C> An information recording/reproduction apparatus that uses an information storage medium which has a wobbled groove along spiral tracks (112) and continuously undergoes data recording for respective predetermined recording units (ECC blocks) along the tracks (112) while being rotated, and comprises a spindle motor (204) for rotating the information storage medium (9), recording system means (202-208) for forming recording marks (127) for respective predetermined recording units (ECC blocks) on the tracks (112) of the information storage medium (9) rotated by the spindle motor (204), and reproduction system means (202, 203, 213-209) for reading information of the recording marks (127) from the information storage medium (9), characterized in that a gap δ which satisfies "$\delta \geqq \tau f$" where τ is the wobble period of the wobbled groove and f is the allowable rotation nonuniformity of the spindle motor (204) is formed between the neighboring predetermined recording units (ECC blocks) along the tracks (112).

According to the arrangements of <1A> to <1C>, since recording is done to form a gap (δ) between neighboring predetermined recording units (ECC blocks), two successive recording units can be prevented from overlapping even when a rotation driving mechanism (spindle motor) suffers rotation nonuniformity, and recorded data can be prevented from being destroyed (due to destruction of some recording marks when an overlapping portion is formed), thus assuring high data reliability. Since no prepit headers are required unlike the prior art, the capacity can be increased accordingly.

<2A> An information storage medium characterized in that upon continuously executing data recording for respective predetermined recording units (ECC blocks) along the tracks (112) on the information storage medium (9), recording can be done to form a gap (δ) between the predetermined recording units (ECC blocks) along the tracks (112).

<2B> An information recording method characterized in that upon continuously executing data recording for respective predetermined recording units (ECC blocks) along the tracks (112) on the information storage medium (9), recording is done (ST22) to form a gap (δ) between the predetermined recording units (ECC blocks) along the tracks (112).

<2C> An information recording/reproduction apparatus characterized in that upon continuously executing data recording for respective predetermined recording units (ECC blocks) along the tracks (112) on the information storage medium (9), recording is done to form a gap (δ) between the predetermined recording units (ECC blocks) along the tracks (112).

According to the arrangements of <2A> to <2C>, since recording is done to form a gap (δ) between neighboring predetermined recording units (ECC blocks), two successive recording units can be prevented from overlapping even when a rotation driving mechanism (spindle motor) suffers rotation nonuniformity, and recorded data can be prevented from being destroyed (due to destruction of some recording marks when an overlapping portion is formed), thus assuring high data reliability. Since no prepit headers are required unlike the prior art, the capacity can be increased accordingly.

<3A> An information storage medium characterized in that the information storage medium (9) is a one-sided, recording multilayer (122, 123) type disc-shaped medium (9) having spiral tracks (112) with a track pitch Pt, data recording is optically done on the tracks (112) with the track pitch Pt via an objective lens (121) having a numerical aperture NA and an intermediate layer (124) having a refractive index n and thickness t, and a length δ of the gap present between the predetermined recording units (ECC blocks) satisfies "$\delta \leqq \pi(D+Pt)\ D/Pt$" (for $D=2t \tan\{\sin^{-1}(NA/n)\}$).

<3B> An information recording method characterized in that an information storage medium (9) is a one-sided, recording multilayer (122, 123) type disc-shaped medium (9) having spiral tracks (112) with a track pitch Pt, data recording is optically done on the tracks (112) with the track pitch Pt via an objective lens (121) having a numerical aperture NA and an intermediate layer (124) having a refractive index n and thickness t, and a length δ of the gap present between the predetermined recording units (ECC blocks) satisfies "$\delta \leqq \pi(D+Pt)\ D/Pt$" (for $D=2t \tan\{\sin^{-1}(NA/n)\}$).

<3C> An information recording/reproduction apparatus characterized in that an information storage medium (9) is a one-sided, recording multilayer (122, 123) type disc-shaped medium (9) having spiral tracks (112) with a track pitch Pt, data recording is optically done on the tracks (112) with the track pitch Pt via an objective lens (121) having a numerical aperture NA and an intermediate layer (124) having a refractive index n and thickness t, and a length δ of the gap present between the predetermined recording units (ECC blocks) satisfies "$\delta \leqq \pi(D+Pt)\ D/Pt$" (for $D=2t \tan\{\sin^{-1}(NA/n)\}$).

According to the arrangements of <3A> to <3C>, in a one-sided, two-recording layer type information storage medium on which information can be read from a plurality of recording layers from one surface side, even when the already recorded portion and non-recorded portion have a light reflectance difference, inter-layer crosstalk due to the influence of the presence/absence of recording marks on the other recording layer can be greatly reduced, and high reliability of a reproduction signal can be assured.

<4A> An information storage medium characterized in that upon continuously executing data recording for respective recording units (ECC blocks) along spiral tracks (112) on a disc-shaped information storage medium (9) having a center of rotation (center of 10), recording is done to form a gap (δ) between the predetermined recording units (ECC blocks) along the tracks (112), and an angular position (A) of the gap (δ) formed on one of at least one pair of neighboring tracks (112*a*, 112*b*) of the tracks (112) with respect to the center of rotation (center of 10) is different from an angular position (B) of the gap (δ) formed in the other (112*b*) of the neighboring tracks with respect to the center of rotation (center of 10).

<4B> An information recording method that continuously executes data recording for respective recording units (ECC blocks) along spiral tracks (112) on a disc-shaped information storage medium (9) having a center of rotation (center of 10) to form a gap (δ) between the predetermined recording units (ECC blocks) along the tracks (112), characterized in that an angular position (A) of the gap (δ) formed on one of at least one pair of neighboring tracks (112*a*, 112*b*) of the tracks (112) with respect to the center of rotation (center of 10) is different from an angular position (B) of the gap (δ) formed in the other (112*b*) of the neighboring tracks with respect to the center of rotation (center of 10).

According to the arrangements of <4A> and <4B>, in a one-sided, two-recording layer type information storage medium on which information can be read from a plurality of recording layers from one surface side, even when the already recorded portion and non-recorded portion have a light reflectance difference, inter-layer crosstalk due to the influence of the presence/absence of recording marks on the other recording layer can be greatly reduced, and high reliability of a reproduction signal can be assured.

<5A> An information storage medium which is a recordable information medium (9) on which data recording is continuously done to form a predetermined gap (δ) between neighboring predetermined recording units (ECC blocks) along tracks (112), characterized in that a mark (141; a unique pattern which repeats itself a plurality of number of times at τ+2τ); a kind of address pattern) which indicates a recording start position for the continuous data recording for respective predetermined recording units (ECC blocks) is pre-recorded by wobble modulation of the tracks (112).

According to the arrangement of <5A>, the following effects (A) to (C) are obtained:

A) Since the mark indicating the recording start position for continuous data recording is present along the tracks on the information storage medium, and the recording start position can be set using that mark, the recording position on the information storage medium can be accurately determined.

B) Since the recording start position can be accurately set by effect (A), length δ of each gap region can be reduced. As a result, the recording capacity (recording efficiency) of the information storage medium can be improved.

In other words, when length δ of each gap region is reduced, and the recording start position precision is low, rewrite data may be partially overwritten on already recorded data (may destroy already recorded data) before and after data to be rewritten upon writing for respective continuous recording units. Since such problem can be avoided using the aforementioned mark, length δ of each gap region can be reduced.

C) When the mark indicating the recording start position is pre-recorded by wobble modulation, even when recording marks are recorded on the mark indicating the recording start position, no influence of a wobble modulation signal is superposed on a reproduction signal of these recording marks (unlike in the conventional prepit type). Therefore, since recording marks can be recorded on the mark indicating the recording start position, the recording efficiency can be improved, and the recording capacity of the information storage medium can be increased.

<6A> An information recording method characterized in that the information storage medium of <5A> is used, and after a mark position indicating a recording start position for continuous data recording is detected (YES in step ST116), continuous recording is started.

<6B> An information recording apparatus characterized in that the information storage medium of <5A> is used, and after a mark position indicating a recording start position for continuous data recording is detected (YES in step ST116), continuous recording is started.

According to the arrangements of <6A> and <6B>, the following effects (D) to (F) are obtained:

D) Since the mark indicating the recording start position for continuous data recording is present along the tracks on the information storage medium, and the recording start position can be set using that mark, the recording position on the information storage medium can be accurately determined.

E) Since the recording start position can be accurately set by effect (D), length δ of each gap region can be reduced. As a result, the recording capacity (recording efficiency) of the information storage medium can be improved.

In other words, when length δ of each gap region is reduced, and the recording start position precision is low, rewrite data may be partially overwritten on already recorded data (may destroy already recorded data) before and after data to be rewritten upon writing for respective continuous recording units. Since such problem can be avoided using the aforementioned mark, length δ of each gap region can be reduced.

F) When the mark indicating the recording start position is pre-recorded by wobble modulation, even when recording marks are recorded on the mark indicating the recording start position, no influence of a wobble modulation signal is superposed on a reproduction signal of these recording marks (unlike in the conventional prepit type). Therefore, since recording marks can be recorded on the mark indicating the recording start position, the recording efficiency can be improved, and the recording capacity of the information storage medium can be increased.

What is claimed is:

1. An information storage medium comprising: at least one pair of neighboring tracks, on which sectors are provided, formed on the information storage medium having a center of rotation, wherein one of said neighboring tracks is configured to record information of a combination of first group recording units and a first non-data portion which is located between the first group recording units, an other of said neighboring tracks is configured to record information of a combination of second group recording units and a second non-data portion which is located between the second group recording units, an angular position of the first non-data portion with respect the center of rotation is different from an angular position of the second non-data portion with respect to the center of rotation, a plurality of ECC blocks are formed on any of neighboring tracks such that one of the first and second non-data portions is formed after an end of one of the ECC blocks and before a start of a next one of the ECC blocks, one of the ECC blocks is formed as a combination of two small ECC blocks, one of the small ECC blocks includes outer-code parity data PO and a set of two of the sectors is provided with the outer-code parity data PO.

* * * * *